(12) United States Patent
Gholmieh et al.

(10) Patent No.: US 11,095,537 B2
(45) Date of Patent: Aug. 17, 2021

(54) MIDDLEWARE DELIVERY OF DASH CLIENT QOE METRICS

(71) Applicant: QUALCOMM Incorporated, San Diego, CA (US)

(72) Inventors: Ralph Akram Gholmieh, San Diego, CA (US); Carlos Marcelo Dias Pazos, Carlsbad, CA (US); Nagaraju Naik, San Diego, CA (US); Thomas Stockhammer, Bergen (DE); Charles Nung Lo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 248 days.

(21) Appl. No.: 15/184,451

(22) Filed: Jun. 16, 2016

(65) Prior Publication Data

US 2016/0373324 A1  Dec. 22, 2016

Related U.S. Application Data

(60) Provisional application No. 62/182,267, filed on Jun. 19, 2015.

(51) Int. Cl.
*H04L 12/26* (2006.01)
*H04L 29/06* (2006.01)
(Continued)

(52) U.S. Cl.
CPC .............. *H04L 43/06* (2013.01); *H04L 41/50* (2013.01); *H04L 43/022* (2013.01); *H04L 43/08* (2013.01);
(Continued)

(58) Field of Classification Search
CPC ....... H04L 41/50; H04L 43/022; H04L 43/08; H04L 65/4076; H04L 65/4084;
(Continued)

(56) References Cited

U.S. PATENT DOCUMENTS 6,882,639 B1 * 4/2005 Balabanian ....... H04L 29/06027
370/237
2013/0128756 A1    5/2013 Zhang et al.
(Continued)

FOREIGN PATENT DOCUMENTS

CN      103001961 A    3/2013
CN      103546477 A    1/2014
(Continued)

OTHER PUBLICATIONS

International Preliminary Report on Patentability issued in international application No. PCT/US2016/038150 by the IPEA/EPO dated May 24, 2017, 6 pp.

(Continued)

*Primary Examiner* — Kevin S Mai
(74) *Attorney, Agent, or Firm* — Shumaker & Sieffert, P.A.

(57) ABSTRACT

An example device for generating quality measurement reports includes one or more hardware-based processors implemented using digital circuitry, the processors being configured to execute a middleware unit and a target application for media data. The middleware unit is configured to receive media data via broadcast or multicast from a server device, generate reception reports covering the reception of the media data according to received reporting directives, deliver at least part of the media data to a target application of the client device, receive quality of experience (QoE) reports from the target application, and provide contents of the QoE reports to a reception reporting server.

29 Claims, 15 Drawing Sheets

(51) Int. Cl.
*H04N 21/00* (2011.01)
*H04L 12/24* (2006.01)
*H04L 29/08* (2006.01)

(52) U.S. Cl.
CPC ...... *H04L 65/4076* (2013.01); *H04L 65/4084* (2013.01); *H04L 65/80* (2013.01); *H04L 67/02* (2013.01); *H04L 67/42* (2013.01); *H04N 21/00* (2013.01)

(58) Field of Classification Search
CPC ......... H04L 65/80; H04L 67/02; H04L 67/42; H04N 21/00
USPC ......................................................... 709/202
See application file for complete search history.

(56) References Cited

U.S. PATENT DOCUMENTS

| | | | | |
|---|---|---|---|---|
| 2013/0268577 | A1* | 10/2013 | Oyman | H04W 76/16 709/203 |
| 2013/0326551 | A1* | 12/2013 | Chatterjee | H04W 24/10 725/9 |
| 2014/0010090 | A1 | 1/2014 | Xiao | |
| 2014/0199044 | A1 | 7/2014 | Gupta et al. | |
| 2014/0201323 | A1 | 7/2014 | Fall et al. | |
| 2014/0269335 | A1 | 9/2014 | Gupta et al. | |
| 2015/0281913 | A1 | 10/2015 | Gholmieh et al. | |
| 2016/0211982 | A1* | 7/2016 | Chen | H04L 12/1868 |

FOREIGN PATENT DOCUMENTS

| | | |
|---|---|---|
| JP | 2014513449 A | 5/2014 |
| WO | 2013074751 A1 | 5/2013 |
| WO | 2014108207 A1 | 7/2014 |
| WO | 2015027370 A1 | 3/2015 |
| WO | 2015064211 A1 | 5/2015 |
| WO | 2015148221 A1 | 10/2015 |

OTHER PUBLICATIONS

3rd Generation Partnership Project, "Technical Specification Group Services and System Aspects; Transparent end-to-end Packet-switched Streaming Service (PSS); Progressive Download and Dynamic Adaptive Streaming over HTTP (3GP-DASH)," Release 10, V10.9.0, Dec. 2014, 115 pp.
International Search Report and Written Opinion of International Application No. PCT/US2016/038150, dated Aug. 19, 2016, 16 pp.
Lecompte D., et al., "Evolved Multimedia Broadcast/Multicast Service (eMBMS) in LTE-Advanced: Overview and Rel-11 Enhancements", IEEE Communications Magazine, vol. 50, No. 11, Nov. 30, 2012, pp. 68-74, ISSN: 0163-6804, DOI: 10.1109/MCOM.2012. 6353684, Chapter eMBMS Quality of Service.
ITU-T H.265, Series H: Audiovisual and Multimedia Systems, Infrastructure of audiovisual services—Coding of moving video, Advanced video coding for generic audiovisual services, The International Telecommunication Union. Apr. 2015, 634 pp.
3RD Generation Partnership Project: 3GPP TS 26.346 Version 13.4.0 Release 13, Apr. 2016, Retrieved from the Internet: http://www.etsi.org/deliver/etsi_ts/126300_126399/126346/13.04.00_60/ts_126346v130400p.pdf, 238 pp.
Response to Written Opinion dated Aug. 19, 2016, from international application No. PCT/US2016/038150, filed Jan. 12, 2017, 5 pp.
Paila et al., "FLUTE—File Delivery over Unidirectional Transport", Internet Engineering Task Force (IETF), Nov. 2012, Retrieved from the Internet: https://tools.ietf.org/html/rfc6726, 55 pp.
Fielding et al., "Hypertext Transfer Protocol—HTTP/1.1", Network Working Group, RFC 2616, Jun. 1999, 160 pp.
"Information technology—Dynamic adaptive streaming over HTTP (DASH), Part 1: Media presentation description and segment formats, Amendment 4: Segment independent SAP Signalling (SISSI), MPD chaining, MPD reset and other extensions," International Standards Organization, Text of ISO/IEC 23009-1:2014/PDAM, Oct. 23, 2015, 17 pp.
3rd Generation Partnership Project, "Technical Specification Group Services and System Aspects; Transparent end-to-end packet-switched streaming service (PSS); 3GPP SMIL language profile," 3GPP TS 26.246 V13.0.0 Release 13, Dec. 2015, 17 pp.
ITU-T H.264, Series H: Audiovisual and Multimedia Systems, Infrastructure of audiovisual services—Coding of moving video, Advanced video coding for generic audiovisual services, The International Telecommunication Union. Jun. 2011, 674 pp.
ITU-T H.263, Series H: Audiovisual and Multimedia Systems, Infrastructure of audiovisual services—Coding of moving video, The International Telecommunication Union. Mar. 2005, 226 pp.
3rd Generation Partnership Project, "Technical Specification Group Services and System Aspects; Transparent end-to-end Packet-switched Streaming Service (PSS); Progressive Download and Dynamic Adaptive Streaming over HTTP (3GP-DASH)," 3GPP TS 26.247, Release 14, V.14.0.0, Dec. 2016, 101 pp.
ITU-T P.10/G.100, Telecommunication Standardization Sector of ITU, Series P: Telephone Transmission Quality, Telephone Installations, Local Line Networks, Nov. 2017, 50 pages.
Taiwan Search Report—TW105119223—TIPO—Feb. 5, 2020.
Orange : "Correction on charging requirements at PCEF", 3GPP DRAFT; S2-130418-REL-12 CR 23203 on Charging Requirements at PCEF, 3rd Generation Partnership Project (3GPP), Mobile Competence Centre; 650, Route Des Lucioles; F-06921 Sophia-Antipolis Cedex, vol. SA WG2, No. Prague, Czech Republic; Jan. 28, 2013-Feb. 1, 2013, Jan. 22, 2013 (Jan. 22, 2013), XP050684950, Retrieved from the Internet: URL:http://www.3gpp.org/ftp/tsg_sa/WG2_Arch/TSGS2_95_Prague/Docs/. 6 pp.

* cited by examiner

MIDDLEWARE DELIVERY OF DASH CLIENT QOE METRICS

This application claims the benefit of U.S. Provisional Application No. 62/182,267, filed Jun. 19, 2015, the entire contents of which are hereby incorporated by reference.

TECHNICAL FIELD

This disclosure relates to transport of media data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. In addition, server devices (such as network servers, devices of content delivery networks (CDNs), and the like) may transmit media data to client devices (such as personal computers, set top boxes, mobile devices such as laptops, cellular telephones, and the like), e.g., via streaming or on-demand network protocols. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also known as High Efficiency Video Coding (HEVC)), and extensions of such standards, to transmit and receive digital video information more efficiently.

After video data has been encoded, the video data may be packetized for transmission or storage. The video data may be assembled into a video file conforming to any of a variety of standards, such as the International Organization for Standardization (ISO) base media file format and extensions thereof, such as AVC.

Data, such as media data including video, audio, and timed text data, may be delivered in a variety of transport methods. One such method is multimedia broadcast/multicast services (MBMS) in Third Generation Partnership Project (3GPP) networks. MBMS, for example, allows the delivery of services of interest to large numbers of subscribers using a single delivery pipe.

Quality of Experience (QoE) reporting by video clients is crucial for monitoring the delivery performance in a system and to gauge the quality of the viewing of end users. MBMS, for example, provides methods to measure transport quality and user QoE through its reception reporting framework. Video delivery methods may also include their own quality measurement reports creating 2 different reporting points on an end device. Aggregating the two types of reports (MBMS and video client types) is worthwhile to ensure that consolidated reports, that cover multiple aspects of the content delivery performance, are easily available to the service providers.

SUMMARY

In general, this disclosure describes techniques related to delivering Dynamic Adaptive Streaming over HTTP (DASH) client quality of experience (QoE) metrics to a reporting server by a middleware unit. That is, a client device may include a DASH client (e.g., a unit within the client device, such as a dedicated hardware unit or a software module, such as a web browser extension) that implements DASH for retrieval of media data, and a middleware unit that receives media data using a broadcast or multicast service, such as Multimedia Broadcast/Multicast Services (MBMS) or enhanced MBMS (eMBMS). The middleware unit also acts as a proxy server with respect to the DASH client, in that the middleware unit caches received media data and provides the media data to the DASH client in response to requests from the client device. Moreover, the middleware unit may receive DASH QoE metrics reports from the client device, and deliver these DASH QoE metrics reports to a reporting server on behalf of the DASH client.

In one example, a method of generating quality measurement reports is performed by a middleware unit of a client device and includes receiving media data via broadcast or multicast from a server device, generating reception reports covering the reception of the media data according to received reporting directives, delivering at least part of the media data to a target application of the client device, receiving quality of experience (QoE) reports from the target application, and providing contents of the QoE reports to a reception reporting server. Again, in this example, the reception reports include the contents of the QoE reports, but in other examples, these reports may be delivered separately and/or to separate reporting servers.

In another example, a device for generating quality measurement reports includes one or more hardware-based processors implemented using digital circuitry, the processors being configured to execute a middleware unit and a target application for media data. The middleware unit is configured to receive media data via broadcast or multicast from a server device, generate reception reports covering the reception of the media data according to received reporting directives, deliver at least part of the media data to a target application of the client device, receive quality of experience (QoE) reports from the target application, and provide contents of the QoE reports to a reception reporting server.

In another example, a device for generating quality measurement reports includes means for receiving media data via broadcast or multicast from a server device, means for generating reception reports covering the reception of the media data according to received reporting directives, means for delivering at least part of the media data to a target application of the device, means for receiving quality of experience (QoE) reports from the target application, and means for providing contents of the QoE reports to a reception reporting server.

In another example, a computer-readable storage medium has stored thereon instructions that, when executed, cause a processor of a client device to receive media data via broadcast or multicast from a server device, generate reception reports covering the reception of the media data according to received reporting directives, deliver at least part of the media data to a target application of the client device, receive quality of experience (QoE) reports from the target application, and provide contents of the QoE reports to a reception reporting server.

The details of one or more examples are set forth in the accompanying drawings and the description below. Other features, objects, and advantages will be apparent from the description and drawings, and from the claims.

DETAILED DESCRIPTION

In general, this disclosure describes techniques for reporting quality of experience (QoE) metrics to one or more servers. In particular, these techniques may be applied where a client device (also referred to as user equipment (UE)) includes a middleware unit that enables a streaming application to access content broadcast over an LTE network. The middleware also acts as the http server for the broadcast content served to the streaming application (the streaming application may be a dynamic adaptive streaming over HTTP (DASH) client) executed by the client device. Whereas conventionally, the DASH client would report QoE metrics to a server, the techniques of this disclosure allow the middleware unit to instruct the DASH client to report the QoE metrics to the middleware instead of, or in addition to, reporting to the DASH QoE metrics server. The middleware will then include the DASH QoE measurement report inside or appended to a MBMS reception report. The techniques of this disclosure are generally directed to the middleware unit receiving the QoE metrics from the streaming application and providing the QoE metrics to the reception reporting server primarily, and optionally to the DASH QoE server.

Figure 1:
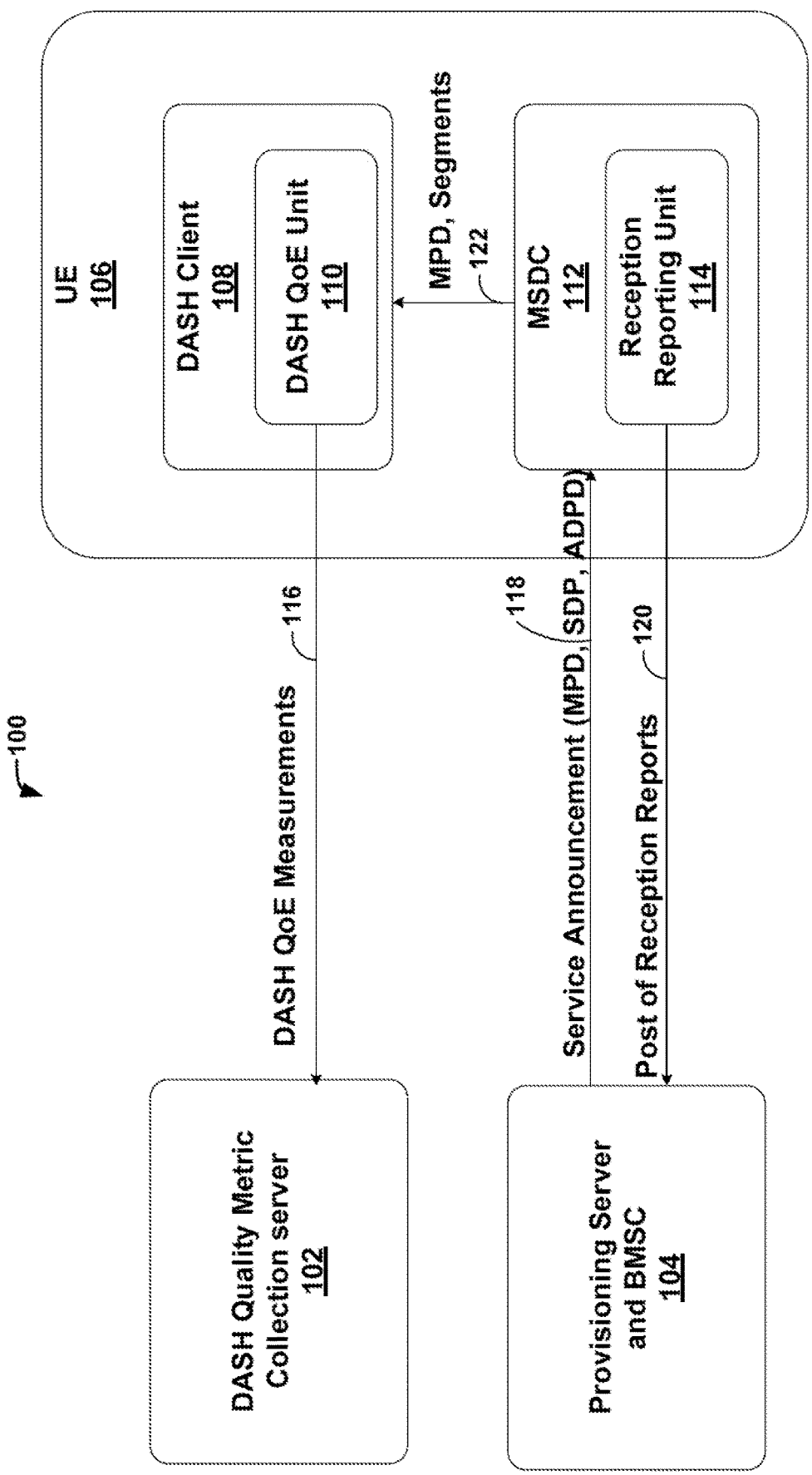
FIG. 1 is a conceptual diagram illustrating a system that uses conventional reporting techniques.

FIG. 1 is a conceptual diagram illustrating a system 100 that uses conventional reporting techniques. In this example, system 100 includes user equipment (UE) 106, including a multicast service device client (MSDC) 112, which is an example of a middleware unit, and a DASH client 108. UE 106 represents an example of a client device, such as a personal computer, cellular telephone, laptop, tablet, set top box, or the like. MSDC 112 may also be referred to as a Multimedia Broadcast Multicast Service (MBMS) middleware unit an enhanced Multimedia Broadcast Multicast Service (eMBMS) middleware unit. DASH client 108

In this example, a provisioning server and broadcast multicast service center (BMSC) 104 delivers service announcements 118 to MSDC 112 of UE 106. The service announcements 118 include, for example, a manifest file (such as a media presentation description (MPD) 122), a session description protocol (SDP), and/or an associated delivery procedure description (ADPD). Reception reporting unit 114 of MSDC 112 collects reception statistics according to metrics specified in the SDP fragment in a service announcement 118 and reception reporting directives in the ADPD fragment in the service announcement 118.

The DASH MPD 122 may also specify metrics for DASH client 108 to collect. Thus, DASH client 108 includes DASH QoE unit 110, which collects the specified metrics (also described as measurements) 116 and uploads the QoE metrics 116 to DASH quality metric collection server 102. Thus, in this example, there are two different collection points, the first (DASH quality metric collection server 102) for QoE metrics and the second (provisioning server and BMSC 104) for MBMS reception reporting metrics 120.

Figure 2:
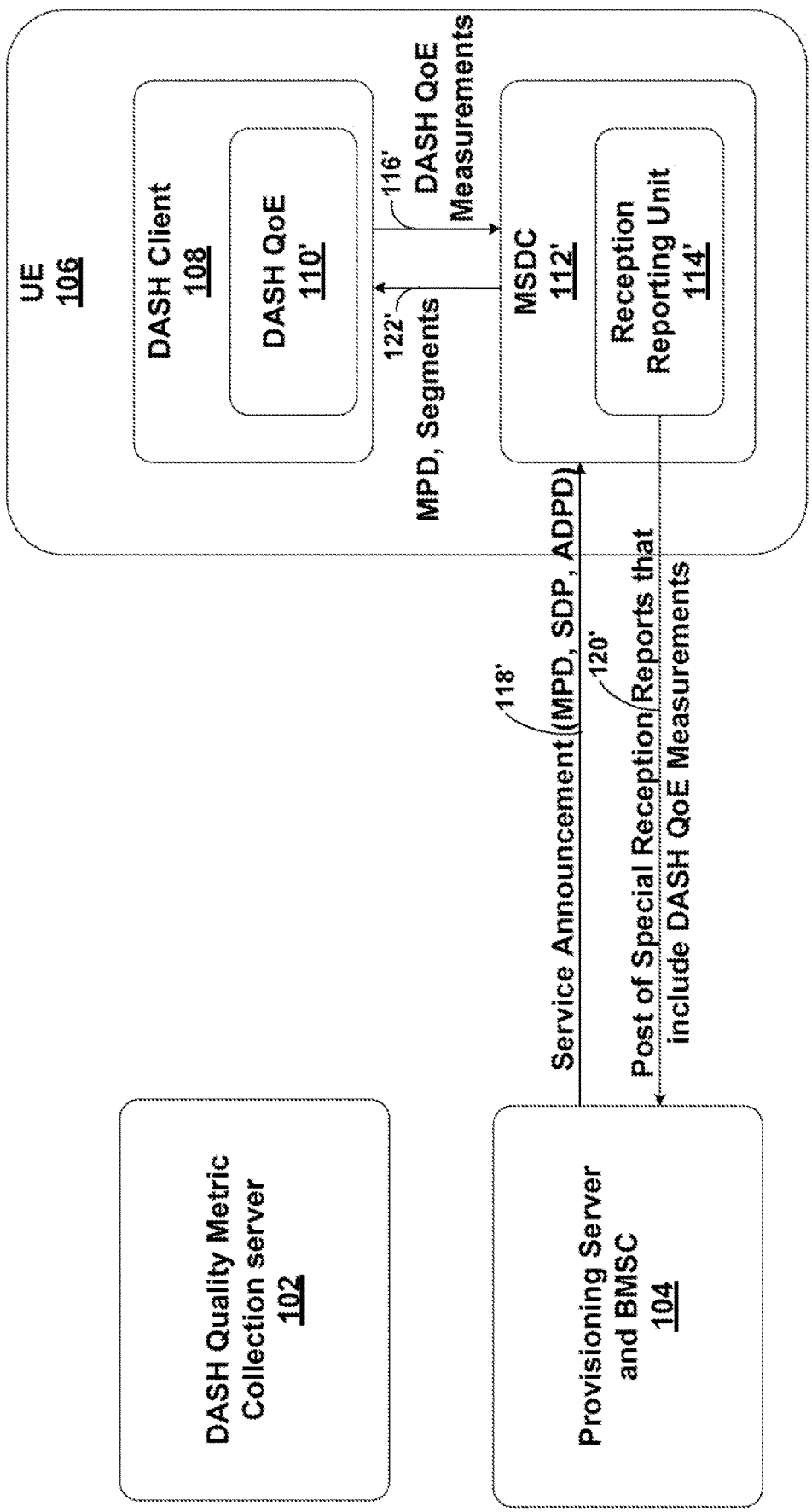
FIG. 2 is a conceptual diagram illustrating an example system in accordance with the techniques of this disclosure.

FIG. 2 is a conceptual diagram illustrating an example system 100' in accordance with the techniques of this disclosure. In accordance with the techniques of this disclosure, DASH client 108' of UE 106', in the example of FIG. 2, uploads DASH QoE metrics 116' to MSDC 112' of UE 106'. In particular, provisioning server and BMSC 104 sends service announcement 118', including MPD and segments 122' in this example. MSDC 112' sends MPD and segments 122' to DASH client 108. The MPD includes DASH reporting directives. In accordance with the techniques of this disclosure, DASH QoE 110' sends DASH QoE metrics 116' to MSDC 112', according to the MPD. Thus, MSDC 112' may collect the DASH QoE measurements report 116', and reception reporting unit 114' may include the DASH QoE measurements report in a corresponding reception report 120' (which may be collected and reported in accordance with the 3GPP MBMS standard).

For example, MSDC 112' may modify an MPD section on metrics to be uploaded, to allow posting of DASH QoE measurements to an HTTP server hosted by MSDC 112'. Modifying the MPD may already be done by the middleware (e.g., MSDC 112') to point the segment URLs in the MPD to a local HTTP server hosted by MSDC 112'. MSDC 112' may also be configured to accept HTTP POST commands related to DASH QoE collection from, e.g., DASH client 108'. Furthermore, MSDC 112' may embed DASH QoE log file(s) in corresponding reception reports 120'. In this example, UE 106' need not report the DASH QoE reports to DASH quality metric collection server 102'. Instead, UE 106' may simply submit the DASH QoE metrics 116' reports along with MBMS reception reports to provisioning server and BMSC 104'. Subsequently, BMSC 104' may submit the DASH QoE reports to DASH quality metric collection server 102'.

Figure 3:
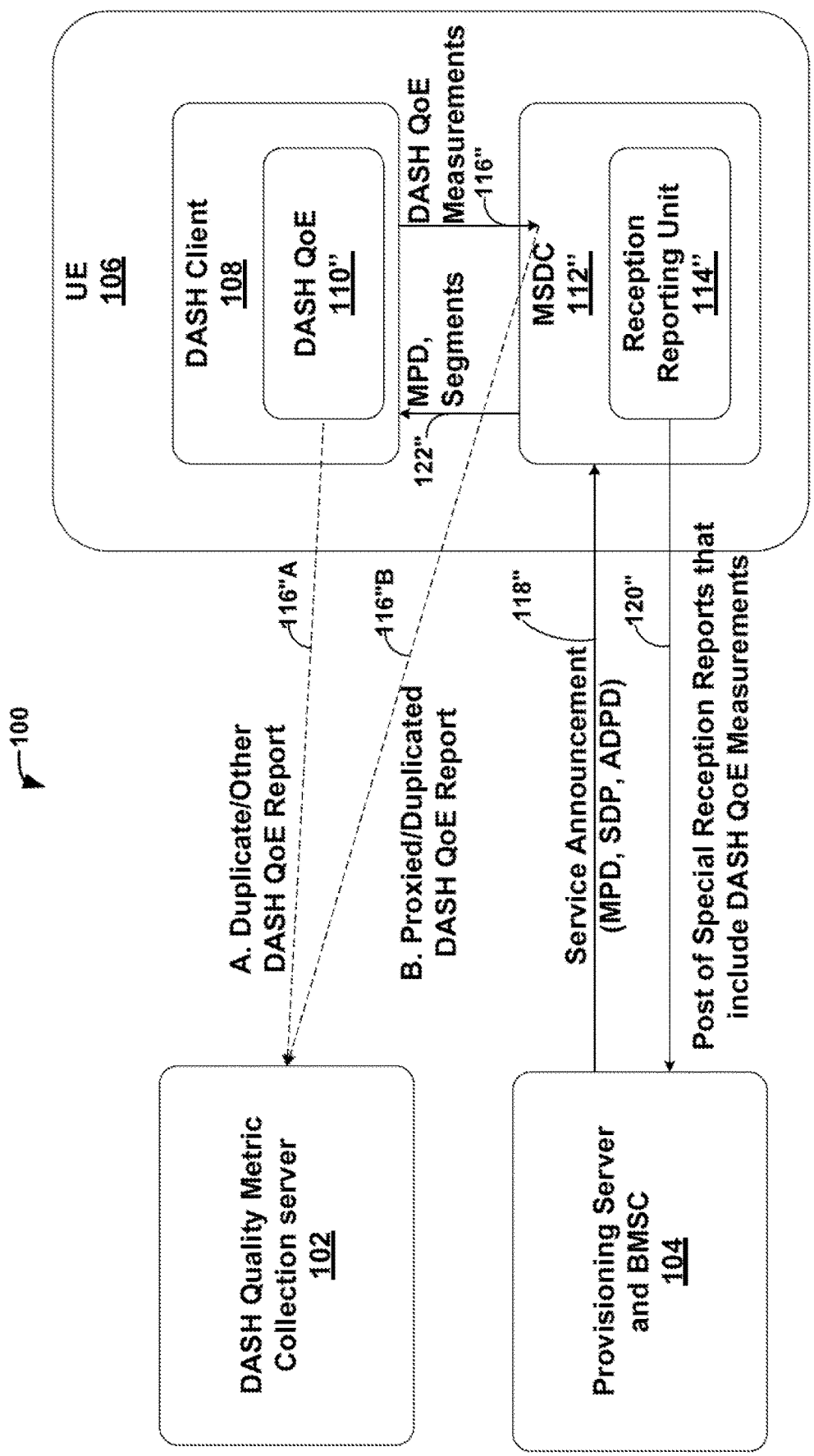
FIG. 3 is a conceptual diagram illustrating another example system in accordance with the techniques of this disclosure.

FIG. 3 is a conceptual diagram illustrating another example system 100" in accordance with the techniques of this disclosure. In general, this example is similar to the example of FIG. 2, except that in the example of FIG. 3, UE 106" reports QoE measurements 116" to DASH quality metric collection server 102" in addition to provisioning server and BMSC 104" with MBMS reception reports 120". That is, in this example, provisioning server and BMSC 104 sends service announcement 118" to UE 106, and MSDC 112" of UE 106 extracts and forwards MPD and segments 122" to DASH client 108. DASH QoE unit 110" reports DASH QoE metrics 116" to MSDC 112". In addition, either or both of DASH QoE 110" and/or MSDC 112" send a duplicate, proxy, or additional DASH QoE report to DASH quality metric collection server 102, as explained in greater detail below.

QoE metrics may vary based on the server to which the metrics are reported. Furthermore, the reported metrics may depend on which, in this example, DASH standard is used (e.g., 3GP-DASH vs. MPEG-DASH). In 3GP-DASH, for example, DASH client 108 may report average throughput, initial playout delay, and MPD information, in addition to a list of HTTP Request/Response transactions, a list of representation switch events, a buffer level, and/or a play list. In MPEG-DASH, on the other hand, reported metrics may include a list of TCP connections, in addition to a list of HTTP request/response transactions, a list of representation switch events, a buffer level, and/or a play list.

Section 10.6 of 3GP-DASH 26.247 version d00 specifies that the quality reporting protocol includes: the XML-based report format defined in Section 10.6.2 of 3GP-DASH and the reporting protocol defined in Section 10.6.3 of 3GP-DASH. Furthermore, 3GP-DASH specifies the MIME type of an XML-formatted QoE report as "application/3gpdash-qoe-report+xml," as defined in Annex J thereof.

It is assumed in this example that a content provider and/or operator desire that a report be uploaded to DASH quality metric collection server 102". Thus, in this example, DASH client 108" (in particular, DASH QoE 110") may post a report directly to MSDC 112" (post to a localhost location) and MSDC 112" may duplicate the report to the DASH quality metric collection server 102" (arrow B in FIG. 3, with duplicated alternative, referred to as "proxied/duplicated DASH QoE report 116"B). Alternatively, rather than DASH QoE 110" reporting the DASH QoE metrics to MSDC 112" directly, MSDC 112" may intercept the measurement report on its way to DASH quality metric collection server 102" (arrow B in FIG. 3, with proxied alternative, referred to as "proxied/duplicated DASH QoE report 116"B).

Additionally or alternatively, DASH client 108" may issue multiple reports: one to MSDC 112" and another to DASH quality metric collection server 102" (arrow A in FIG. 3, referred to as "duplicated/other DASH QoE report 116" A). The reports may be for different metrics or for the same metrics based on the same or different collection and upload directives.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A particular media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more periods. Each period may contain one or more representations for the same media content. A representation may be one of a number of alternative encoded versions of audio or video data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

Figure 4:
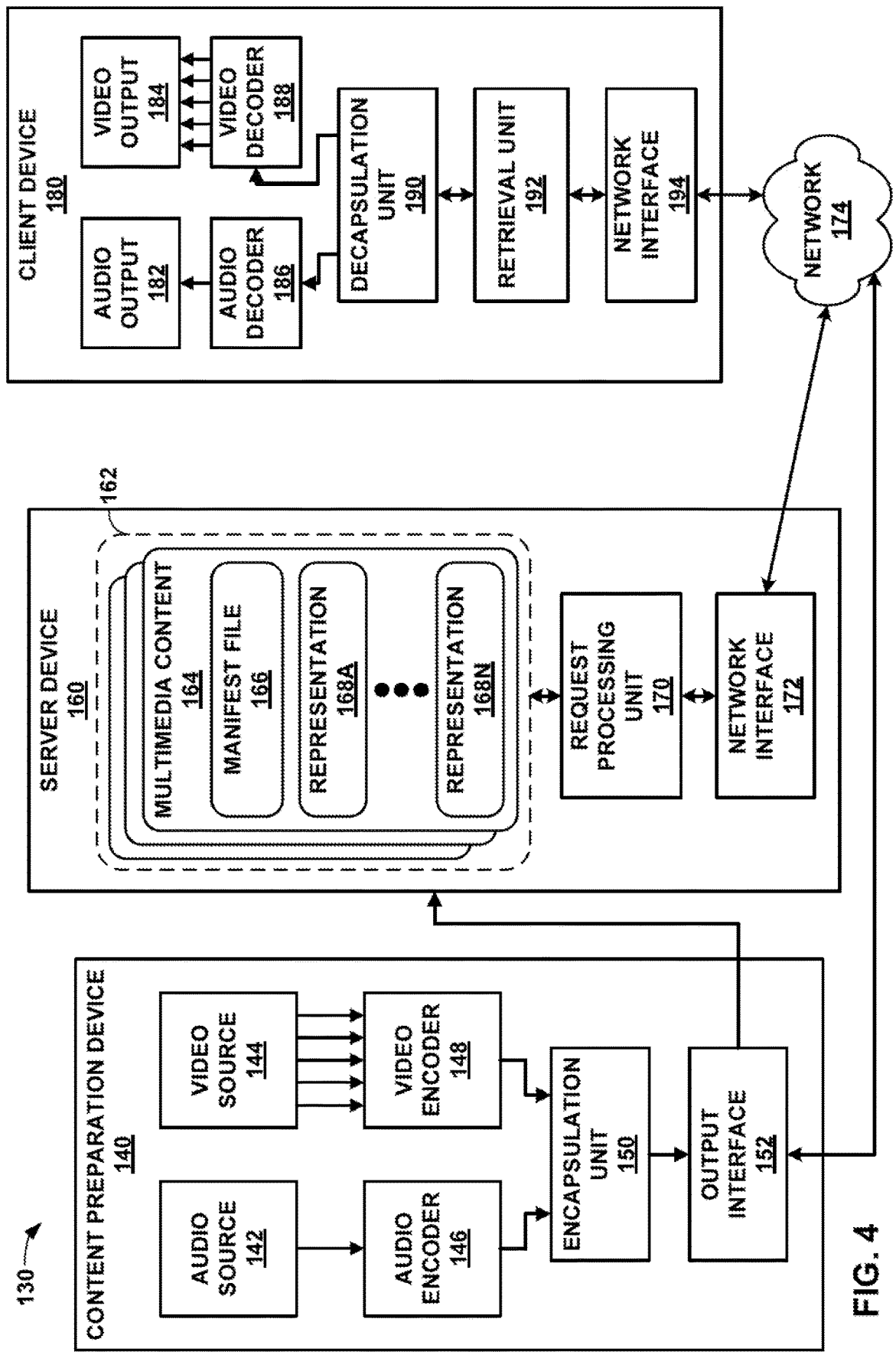
FIG. 4 is a block diagram illustrating an example system that implements techniques for streaming media data over a network.

FIG. 4 is a block diagram illustrating an example system 130 that implements techniques for streaming media data over a network. In this example, system 130 includes content preparation device 140, server device 160, and client device 180. Client device 180 and server device 160 are communicatively coupled by network 174, which may comprise the Internet. In some examples, content preparation device 140 and server device 160 may also be coupled by network 174 or another network, or may be directly communicatively coupled. In some examples, content preparation device 140 and server device 160 may comprise the same device.

Content preparation device 140, in the example of FIG. 4, comprises audio source 142 and video source 144. Audio source 142 may comprise, for example, a microphone that produces electrical signals representative of captured audio data to be encoded by audio encoder 146. Alternatively, audio source 142 may comprise a storage medium storing previously recorded audio data, an audio data generator such as a computerized synthesizer, or any other source of audio data. Video source 144 may comprise a video camera that produces video data to be encoded by video encoder 148, a storage medium encoded with previously recorded video data, a video data generation unit such as a computer graphics source, or any other source of video data. Content preparation device 140 is not necessarily communicatively coupled to server device 160 in all examples, but may store multimedia content to a separate medium that is read by server device 160.

Raw audio and video data may comprise analog or digital data. Analog data may be digitized before being encoded by audio encoder 146 and/or video encoder 148. Audio source 142 may obtain audio data from a speaking participant while the speaking participant is speaking, and video source 144 may simultaneously obtain video data of the speaking participant. In other examples, audio source 142 may comprise a computer-readable storage medium comprising stored audio data, and video source 144 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 142 contemporaneously with video data captured (or generated) by video source 144 that is contained within the video frames. For example, while a speaking participant generally produces audio data by speaking, audio source 142 captures the audio data, and video source 144 captures video data of the speaking participant at the same time, that is, while audio source 142 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 146 may encode a timestamp in each encoded audio frame that represents a time at which the audio data for the encoded audio frame was recorded, and similarly, video encoder 148 may encode a timestamp in each encoded video frame that represents a time at which the video data for encoded video frame was recorded. In such examples, an audio frame corresponding to a video frame may comprise an audio frame comprising a timestamp and a video frame comprising the same timestamp. Content preparation device 140 may include an internal clock from which audio encoder 146 and/or video encoder 148 may generate the timestamps, or that audio source 142 and video source 144 may use to associate audio and video data, respectively, with a timestamp.

In some examples, audio source 142 may send data to audio encoder 146 corresponding to a time at which audio data was recorded, and video source 144 may send data to video encoder 148 corresponding to a time at which video data was recorded. In some examples, audio encoder 146 may encode a sequence identifier in encoded audio data to indicate a relative temporal ordering of encoded audio data but without necessarily indicating an absolute time at which the audio data was recorded, and similarly, video encoder 148 may also use sequence identifiers to indicate a relative temporal ordering of encoded video data. Similarly, in some examples, a sequence identifier may be mapped or otherwise correlated with a timestamp.

Audio encoder 146 generally produces a stream of encoded audio data, while video encoder 148 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC and the upcoming High Efficiency Video Coding (HEVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile idc (profile indicator) value, while a level may be signaled with a level idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in the example of H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8x8 pixels. In this manner, a decoder may determine whether the decoder is capable of properly decoding the bitstream.

In the example of FIG. 4, encapsulation unit 150 of content preparation device 140 receives elementary streams comprising coded video data from video encoder 148 and elementary streams comprising coded audio data from audio encoder 146. In some examples, video encoder 148 and audio encoder 146 may each include packetizers for forming PES packets from encoded data. In other examples, video encoder 148 and audio encoder 146 may each interface with respective packetizers for forming PES packets from encoded data. In still other examples, encapsulation unit 150 may include packetizers for forming PES packets from encoded audio and video data.

Video encoder 148 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream id that identifies the elementary stream to which the PES packet belongs. Encapsulation unit 150 is responsible for assembling elementary streams into video files (e.g., segments) of various representations.

Encapsulation unit 150 receives PES packets for elementary streams of a representation from audio encoder 146 and video encoder 148 and forms corresponding network abstraction layer (NAL) units from the PES packets. In the example of H.264/AVC (Advanced Video Coding), coded video segments are organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture, hence coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 150 may form a manifest file, such as a media presentation descriptor (MPD) that describes characteristics of the representations. Encapsulation unit 150 may format the MPD according to extensible markup language (XML).

Encapsulation unit 150 may provide data for one or more representations of multimedia content, along with the manifest file (e.g., the MPD) to output interface 152. Output interface 152 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 150 may provide data of each of the representations of multimedia content to output interface 152, which may send the data to server device 160 via network transmission or storage media. In the example of FIG. 4, server device 160 includes storage medium 162 that stores various multimedia contents 164, each including a respective manifest file 166 and one or more representations 168A-168N (representations 168). In some examples, output interface 152 may also send data directly to network 174.

In some examples, representations 168 may be separated into adaptation sets. That is, various subsets of representations 168 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 166 may include data indicative of the subsets of representations 168 corresponding to particular adaptation sets, as well as common characteristics for the adaptation sets. Manifest file 166 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 166.

Server device 160 includes request processing unit 170 and network interface 172. In some examples, server device 160 may include a plurality of network interfaces. Furthermore, any or all of the features of server device 160 may be implemented on other devices of a content delivery network, such as routers, bridges, proxy devices, switches, or other devices. In some examples, intermediate devices of a content delivery network may cache data of multimedia content 164, and include components that conform substantially to those of server device 160. In general, network interface 172 is configured to send and receive data via network 174.

Request processing unit 170 is configured to receive network requests from client devices, such as client device 180, for data of storage medium 162. For example, request processing unit 170 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 170 may be configured to receive HTTP GET or partial GET requests and provide data of multimedia content 164 in response to the requests. The requests may specify a segment of one of representations 168, e.g., using a URL of the segment. In some examples, the requests may also specify one or more byte ranges of the segment, thus comprising partial GET requests. Request processing unit 170 may further be configured to service HTTP HEAD requests to provide header data of a segment of one of representations 168. In any case, request processing unit 170 may be configured to process the requests to provide requested data to a requesting device, such as client device 180.

Additionally or alternatively, request processing unit 170 may be configured to deliver media data via a broadcast or multicast protocol, such as eMBMS. Content preparation device 140 may create DASH segments and/or sub-segments in substantially the same way as described, but server device 160 may deliver these segments or sub-segments using eMBMS or another broadcast or multicast network transport protocol. For example, request processing unit 170 may be configured to receive a multicast group join request from client device 180. That is, server device 160 may advertise an Internet protocol (IP) address associated with a multicast group to client devices, including client device 180, associated with particular media content (e.g., a broadcast of a live event). Client device 180, in turn, may submit a request to join the multicast group. This request may be propagated throughout network 174, e.g., routers making up network 174, such that the routers are caused to direct traffic destined for the IP address associated with the multicast group to subscribing client devices, such as client device 180.

As illustrated in the example of FIG. 4, multimedia content 164 includes manifest file 166, which may correspond to a media presentation description (MPD). In the case of an MPD, corresponding to the DASH standard, manifest file 166 may also include directive on what metrics a client may collect and report to a specified server. Manifest file 166 may contain descriptions of different alternative representations 168 (e.g., video services with different qualities) and the description may include, e.g., codec information, a profile value, a level value, a bitrate, and other descriptive characteristics of representations 168. Client device 180 may retrieve the MPD of a media presentation to determine how to access segments of representations 168.

In particular, retrieval unit 192 may retrieve configuration data (not shown) of client device 180 to determine decoding capabilities of video decoder 188 and rendering capabilities of video output 184. The configuration data may also include any or all of a language preference selected by a user of client device 180, one or more camera perspectives corresponding to depth preferences set by the user of client device 180, and/or a rating preference selected by the user of client device 180. Retrieval unit 192 may comprise, for example, a web browser or a media client configured to submit HTTP GET and partial GET requests. Retrieval unit 192 may correspond to software instructions executed by one or more processors or processing units (not shown) of client device 180. In some examples, all or portions of the functionality described with respect to retrieval unit 192 may be implemented in hardware, or a combination of hardware, software, and/or firmware, where requisite hardware may be provided to execute instructions for software or firmware.

Retrieval unit 192 may compare the decoding and rendering capabilities of client device 180 to characteristics of representations 168 indicated by information of manifest file 166. Retrieval unit 192 may initially retrieve at least a portion of manifest file 166 to determine characteristics of representations 168. For example, retrieval unit 192 may request a portion of manifest file 166 that describes characteristics of one or more adaptation sets. Retrieval unit 192 may select a subset of representations 168 (e.g., an adaptation set) having characteristics that can be satisfied by the coding and rendering capabilities of client device 180. Retrieval unit 192 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 192 may retrieve data from relatively high bitrate representations, whereas when available network bandwidth is low, retrieval unit 192 may retrieve data from relatively low bitrate representations. In this manner, client device 180 may stream multimedia data over network 174 while also adapting to changing network bandwidth availability of network 174.

Additionally or alternatively, retrieval unit 192 may be configured to receive data in accordance with a broadcast or multicast network protocol, such as MBMS, eMBMS, or IP multicast. In such examples, retrieval unit 192 may submit a request to join a multicast network group associated with particular media content. After joining the multicast group, retrieval unit 192 may receive data of the multicast group without further requests issued to server device 160 or content preparation device 140. Retrieval unit 192 may submit a request to leave the multicast group when data of the multicast group is no longer needed, e.g., to stop playback or to change channels to a different multicast group.

In accordance with the techniques of this disclosure, retrieval unit 192 may include a streaming application (e.g., a DASH client) and a middleware unit. The middleware unit may be configured to receive quality of experience (QoE) measurements from the DASH client and deliver the QoE measurements, along with eMBMS reception reports, to, e.g., server device 160. That is, client device 180 may correspond to UE 106', 106" of FIGS. 2, 3, and server device 160 may correspond to provisioning server and BMSC 104', 104" of FIGS. 2, 3. Although not shown in FIG. 4, in some examples, system 130 may additionally include a DASH quality metric collection server, to which the DASH client and/or the middleware unit may report the DASH QoE measurements, as discussed with respect to FIG. 3 above.

Network interface 194 may receive and provide data of segments of a selected representation to retrieval unit 192, which may in turn provide the segments to decapsulation unit 190. Decapsulation unit 190 may decapsulate elements of a video file into constituent PES streams, depacketize the PES streams to retrieve encoded data, and send the encoded data to either audio decoder 186 or video decoder 188, depending on whether the encoded data is part of an audio or video stream, e.g., as indicated by PES packet headers of the stream. Audio decoder 186 decodes encoded audio data and sends the decoded audio data to audio output 182, while video decoder 188 decodes encoded video data and sends the decoded video data, which may include a plurality of views of a stream, to video output 184.

Video encoder 148, video decoder 188, audio encoder 146, audio decoder 186, encapsulation unit 150, retrieval unit 192, request processing unit 170, and decapsulation unit 190 each may be implemented as any of a variety of suitable fixed and/or programmable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 148 and video decoder 188 may be included in one or more encoders or decoders, either of which may be integrated as part of a combined video encoder/decoder (CODEC). Likewise, each of audio encoder 146 and audio decoder 186 may be included in one or more encoders or decoders, either of which may be integrated as part of a combined CODEC. An apparatus including video encoder 148, video decoder 188, audio encoder 146, audio decoder 186, encapsulation unit 150, retrieval unit 192, request processing unit 170, and/or decapsulation unit 190 may comprise an integrated circuit, a microprocessor, and/or a wireless communication device, such as a cellular telephone.

Client device 180, server device 160, and/or content preparation device 140 may be configured to operate in accordance with the techniques of this disclosure. For purposes of example, this disclosure describes these techniques with respect to client device 180 and server device 160. However, it should be understood that content preparation device 140 may be configured to perform these techniques, instead of (or in addition to) server device 160.

Encapsulation unit 150 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 150 may receive encoded video data from video encoder 148 in the form of PES packets of elementary streams. Encapsulation unit 150 may associate each elementary stream with a corresponding program.

Encapsulation unit 150 may also assemble access units from a plurality of NAL units. In general, an access unit may comprise one or more NAL units for representing a frame of video data, as well audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 166. Client device 180 may retrieve the MPD of a media presentation to determine how to access movie fragments of various presentations. Movie fragments may be located in movie fragment boxes (moof boxes) of video files.

Manifest file 166 (which may comprise, for example, an MPD) may advertise availability of segments of representations 168. That is, the MPD may include information indicating the wall-clock time at which a first segment of one of representations 168 becomes available, as well as information indicating the durations of segments within representations 168. In this manner, retrieval unit 192 of client device 180 may determine when each segment is available, based on the starting time as well as the durations of the segments preceding a particular segment.

After encapsulation unit 150 has assembled NAL units and/or access units into a video file based on received data, encapsulation unit 150 passes the video file to output interface 152 for output. In some examples, encapsulation unit 150 may store the video file locally or send the video file to a remote server via output interface 152, rather than sending the video file directly to client device 180. Output interface 152 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 152 outputs the video file to a computer-readable medium, such as, for example, a transmission signal, a magnetic medium, an optical medium, a memory, a flash drive, or other computer-readable medium.

Network interface 194 may receive a NAL unit or access unit via network 174 and provide the NAL unit or access unit to decapsulation unit 190, via retrieval unit 192. Decapsulation unit 190 may decapsulate a elements of a video file into constituent PES streams, depacketize the PES streams to retrieve encoded data, and send the encoded data to either audio decoder 186 or video decoder 188, depending on whether the encoded data is part of an audio or video stream, e.g., as indicated by PES packet headers of the stream. Audio decoder 186 decodes encoded audio data and sends the decoded audio data to audio output 182, while video decoder 188 decodes encoded video data and sends the decoded video data, which may include a plurality of views of a stream, to video output 184.

The MPD includes a metrics element that contains the metrics to be collected, and the upload parameters. The upload parameters include a reporting element that may be expanded through the use of specific reporting@schemeIdUri values. Section 10.5 of 3GP-DASH 26.246 version d00 specifies that the URN to be used for the Reporting@schemeIdUri shall be "urn:3GPP:ns:PSS:DASH:QM10." 3GP-DASH also defines semantics of the scheme information for the 3GP-DASH quality reporting scheme as follows:

| Element or Attribute Name | Use | Description |
| --- | --- | --- |
| @apn | O | This attribute gives the access point that should be used for sending the QoE reports. |
| @format | O | This field gives the requested format for the reports. Possible formats are: "uncompressed" and "gzip". |
| @samplepercentage | O | Percentage of the clients that should report QoE. The client uses a random number generator with the given percentage to find out if the client should report or not. |
| @reportingserver | M | The reporting server URL to which the reports will be sent. |
| @reportinginterval | O | Indicates the time(s) reports should be sent. If not present, then the client should send a report after the streaming session has ended. If present, @reportingInterval = n indicates that the client should send a report every n-th second provided that new metrics information has become available since the previous report. |

Legend:
For attributes:
M = Mandatory,
O = Optional,
OD = Optional with Default Value,
CM = Conditionally Mandatory.
For elements: <minOccurs> . . . <maxOccurs> (N = unbounded)
Elements are bold; attributes are non-bold and preceded with an @

Figure 5:
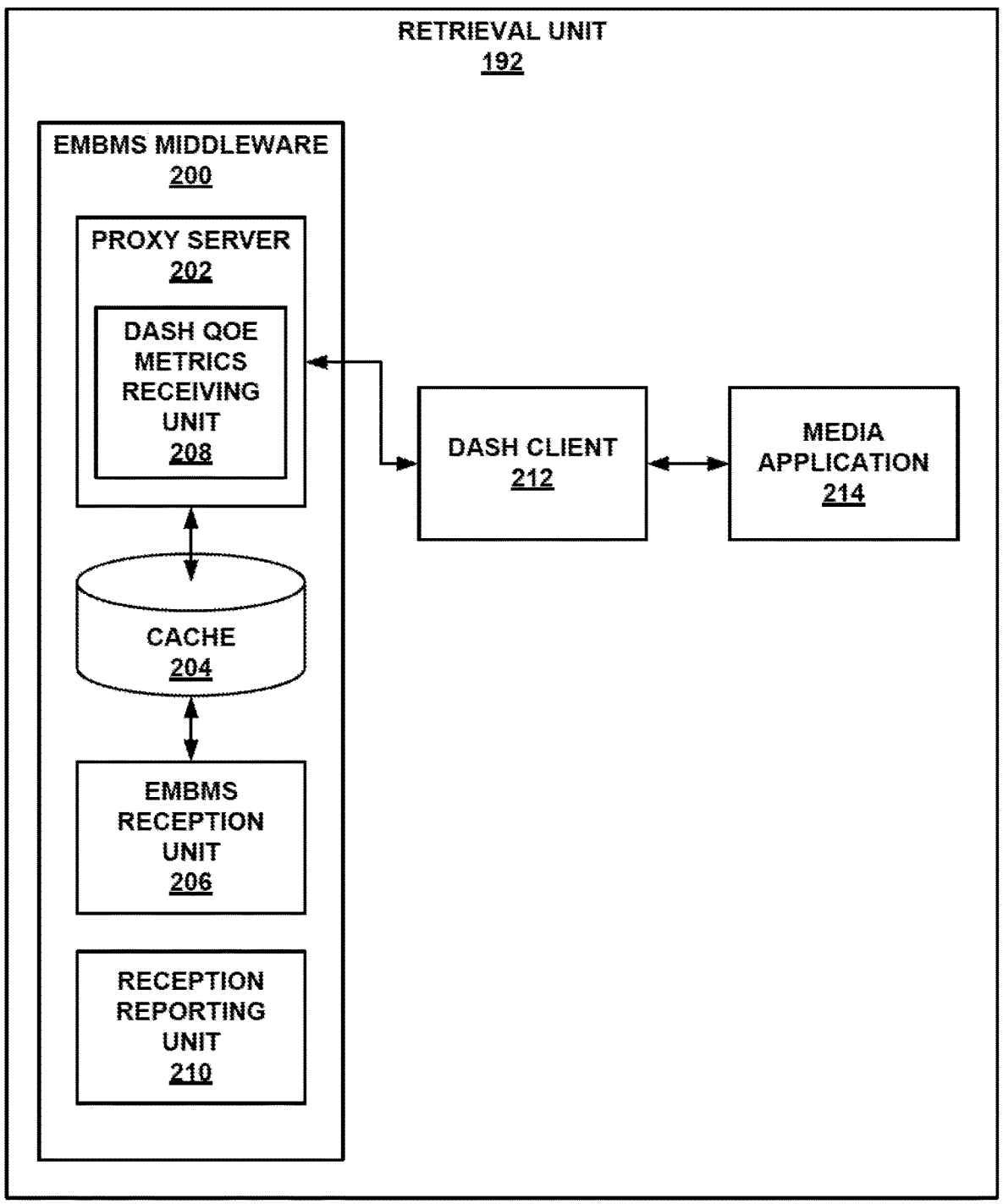
FIG. 5 is a block diagram illustrating an example set of components of the retrieval unit of FIG. 4 in greater detail.

FIG. 5 is a block diagram illustrating an example set of components of retrieval unit 192 of FIG. 4 in greater detail. In this example, retrieval unit 192 includes eMBMS middleware unit 200, DASH client 212, and media application 214. eMBMS middleware unit 200 may generally correspond to MSDC 112', 112" of FIGS. 2, 3, while DASH client 212 may correspond to DASH client 108', 108" of FIGS. 2, 3.

In this example, eMBMS middleware unit 200 further includes eMBMS reception unit 206, cache 204, proxy/local server 202, and reception reporting unit 210. In this example, eMBMS reception unit 206 is configured to receive data via eMBMS, e.g., according to File Delivery over Unidirectional Transport (FLUTE), described in T. Paila et al., "FLUTE—File Delivery over Unidirectional Transport," Network Working Group, RFC 6726, November 2012, available at tools.ietf.org/html/rfc6726, or Real-Time Object Delivery over Unidirectional Transport (ROUTE) protocol. That is, eMBMS reception unit 206 may receive files via broadcast from, e.g., server device 160 of FIG. 4, which may act as a BM-SC.

As eMBMS middleware unit 200 receives data for files, eMBMS middleware unit may store the received data in cache 204. Cache 204 may comprise a computer-readable storage medium, such as flash memory, a hard disk, RAM, or any other suitable storage medium.

Proxy/local server 202 may act as an HTTP server for DASH client 212. For example, middleware may modify the MPD file or other manifest file to DASH client 212. Middleware 200 would advertise adjusted availability times for segments in the MPD file, as well as hyperlinks from which the segments can be retrieved locally. These hyperlinks may include a localhost address prefix corresponding to client device 180 of FIG. 4 (e.g., 127.0.0.1 for IPv4). In this manner, DASH client 212 may request segments from local HTTP server 202 using HTTP GET or partial GET requests. For example, for a segment available from link http://127.0.0.1/rep1/seg3, DASH client 212 may construct an HTTP GET request that includes a request for http://127.0.0.1/rep1/seg3, and submit the request to proxy/local server 202. Proxy/local server 202 may retrieve requested data from cache 204 and provide the data to DASH client 212 in response to such requests. Alternatively, eMBMS middleware unit 200 need not modify the URLs in the MPD and act as a proxy. Requests targeted for the DASH Server 170, are intercepted by eMBMS middleware unit 200 and served from the local cache.

In accordance with the techniques of this disclosure, HTTP proxy/local server 202 also includes DASH QoE metrics receiving unit 208. DASH QoE metrics receiving unit 208 is generally configured to intercept (in the case of proxy, note that proxy/local server 202 may optionally let reports through to a DASH measurement server) or receive (when acting as a local server) DASH reports from the DASH Client e.g. accepting HTTP post commands. The report is then forwarded to reception reporting unit 210, which then may report DASH QoE metrics on behalf of DASH client 212 to a server device and/or may include the DASH QoE measurement report in a reception report. For example, DASH QoE metrics may receive QoE metrics from DASH client 212. That is, proxy/local server 202 may be configured to receive HTTP POST commands from DASH client 212 including DASH QoE metrics in accordance with a media presentation description (MPD) or other manifest file. Furthermore, reception reporting unit 210 reports reception in accordance with, e.g., eMBMS. In some examples, reception reporting unit 210 sends a single report including both DASH QoE metrics and eMBMS reception reports. In other examples, reception reporting unit 210 sends separate reports for eMBMS reception reports and DASH QoE metrics.

After receiving a DASH QoE measurement report from DASH client 212, reception reporting unit 210 may report the DASH QoE metrics to a server device, along with reception reports related to a protocol by which eMBMS middleware unit 200 reports on the reception of files encapsulating the DASH data. In addition, in some examples, one or both of eMBMS middleware unit 200 and/or DASH client 212 may be configured to also report DASH QoE metrics to a dedicated DASH metrics server, as discussed with respect to FIG. 3 above.

The server device 160 (FIG. 1) may also include a BMSC function which delivers a service announcement to eMBMS middleware unit 200. As part of this invention, the service announcement may further include directives on the type and contents of the desired DASH QoE measurement report. For example, the Associated Delivery Procedure (ADP) fragment of the service announcement may include new fields and elements that describe the desired metrics for the DASH QoE report, as well as other parameter. An example implementation is later described in FIGS. 9 and 10 below.

In a more general sense, the DASH QoE collection directives may be delivered through other means, e.g., OMA DM, a configuration file, the original MPD itself, or any other means.

EMBMS middleware unit 200 may then communicate the above directives to DASH client 212. One method for communicating these directives is that eMBMS middleware unit 200 may modify the MPD hosted locally (except in the case where the original MPD carries the directives, in which case eMBMS middleware unit 200 need not modify the MPD) to reflect the metrics collection parameters obtained from the server 160 of FIG. 4.

In another example, eMBMS middleware unit 200 may modify the MPD to collect the desired metrics or a superset of the metrics, and to always report to eMBMS middleware unit 200. EMBMS middleware unit 200 can then reduce the metrics to the set requested by the server 160, and report with the probability requested by the server 160.

In still another example, the server 160 instructs eMBMS middleware unit 200 to collect reception reports according to collection directives that include a reception reporting collection probability (samplingPercentage parameter in current ADP fragment). The DASH QoE Collection directive sent to eMBMS middleware unit 200 can then include an independent collection probability or a conditional collection probability. The relative collection probability indicates the conditional collection of DASH QoE measurements only when reception reporting is being collected e.g. if the reception reporting sampling percentage parameter is 50% and that of the conditional collection probability is 50% as well, then reception reports are collected for 50% of the sessions, and DASH measurement reports are collected for 50% of those sessions where reception reporting is active. The resulting absolute probability of collection for DASH QoE measurements is then 25%.

Figure 6:
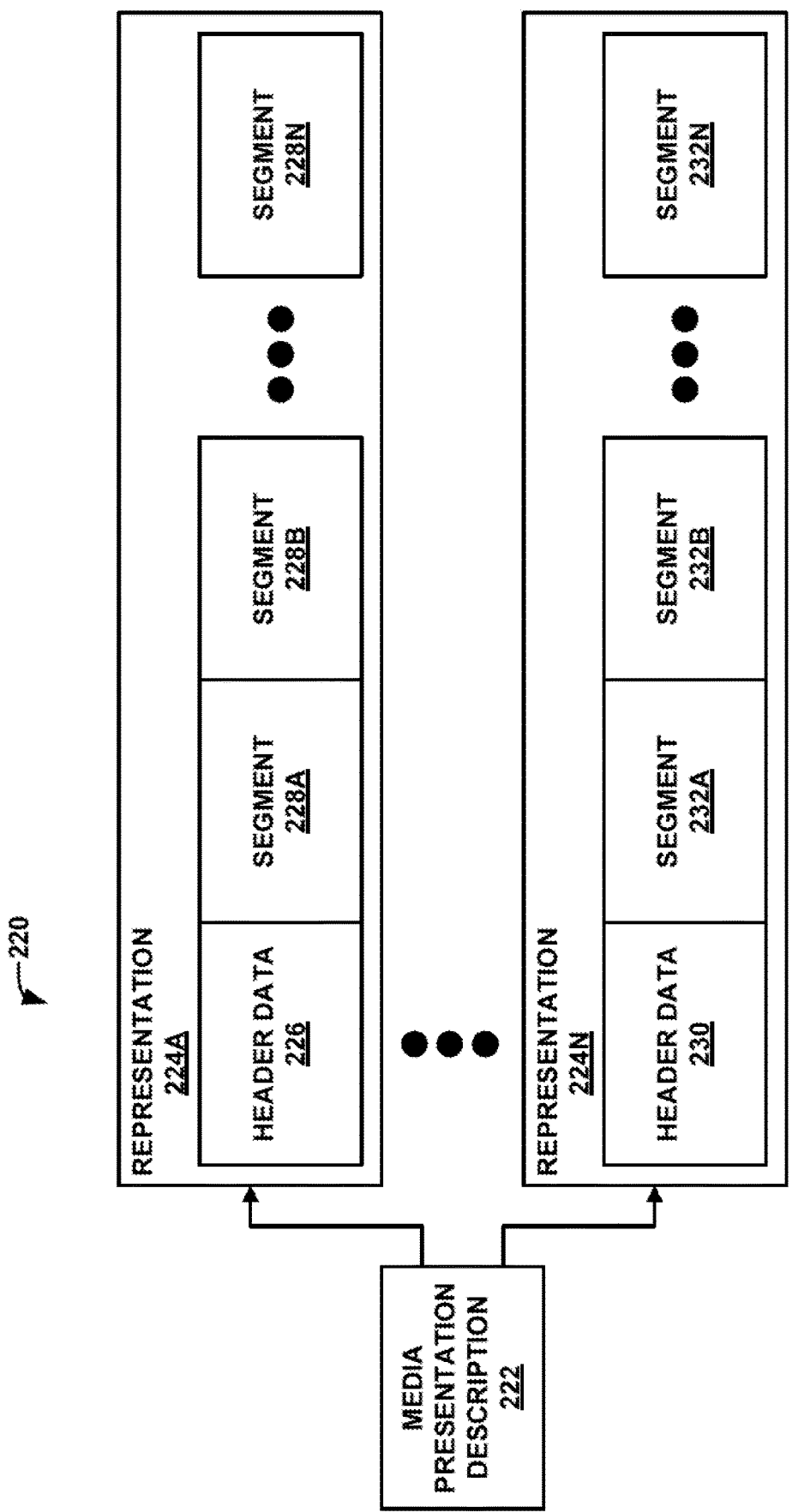
FIG. 6 is a conceptual diagram illustrating elements of example multimedia content.

FIG. 6 is a conceptual diagram illustrating elements of example multimedia content 220. Multimedia content 220 may correspond to multimedia content 164 (FIG. 4), or another multimedia content stored in storage medium 162. In the example of FIG. 6, multimedia content 220 includes media presentation description (MPD) 222 and a plurality of representations 224A-224N (representations 224). Representation 224A includes optional header data 226 and segments 228A-228N (segments 228), while representation 224N includes optional header data 230 and segments 232A-232N (segments 232). The letter N is used to designate the last movie fragment in each of representations 224 as a matter of convenience. In some examples, there may be different numbers of movie fragments between representations 224.

MPD 222 may comprise a data structure separate from representations 224. MPD 222 may correspond to manifest file 166 of FIG. 4. Likewise, representations 224 may correspond to representations 168 of FIG. 4. In general, MPD 222 may include data that generally describes characteristics of representations 224, such as coding and rendering characteristics, adaptation sets, a profile to which MPD 222 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 226, when present, may describe characteristics of segments 228, e.g., temporal locations of random access points (RAPs, also referred to as stream access points (SAPs)), which of segments 228 includes random access points, byte offsets to random access points within segments 228, uniform resource locators (URLs) of segments 228, or other aspects of segments 228. Header data 230, when present, may describe similar characteristics for segments 232. Additionally or alternatively, such characteristics may be fully included within MPD 222.

Segments 228, 232 include one or more coded video samples, each of which may include frames or slices of video data. Each of the coded video samples of segments 228 may have similar characteristics, e.g., height, width, and bandwidth requirements. Such characteristics may be described by data of MPD 222, though such data is not illustrated in the example of FIG. 6. MPD 222 may include characteristics as described by the 3GPP Specification, with the addition of any or all of the signaled information described in this disclosure.

Each of segments 228, 232 may be associated with a unique uniform resource locator (URL). Thus, each of segments 228, 232 may be independently retrievable using a streaming network protocol, such as DASH. In this manner, a destination device, such as client device 180 of FIG. 4, may use an HTTP GET request to retrieve segments 228 or 232. In some examples, client device 180 may use HTTP partial GET requests to retrieve specific byte ranges of segments 228 or 232.

In accordance with the techniques of this disclosure, MPD 222 may include data specifying metrics to be reported to a server device. For example, MPD 222 may include data conforming to that described with respect to FIG. 8 below.

Figure 7:
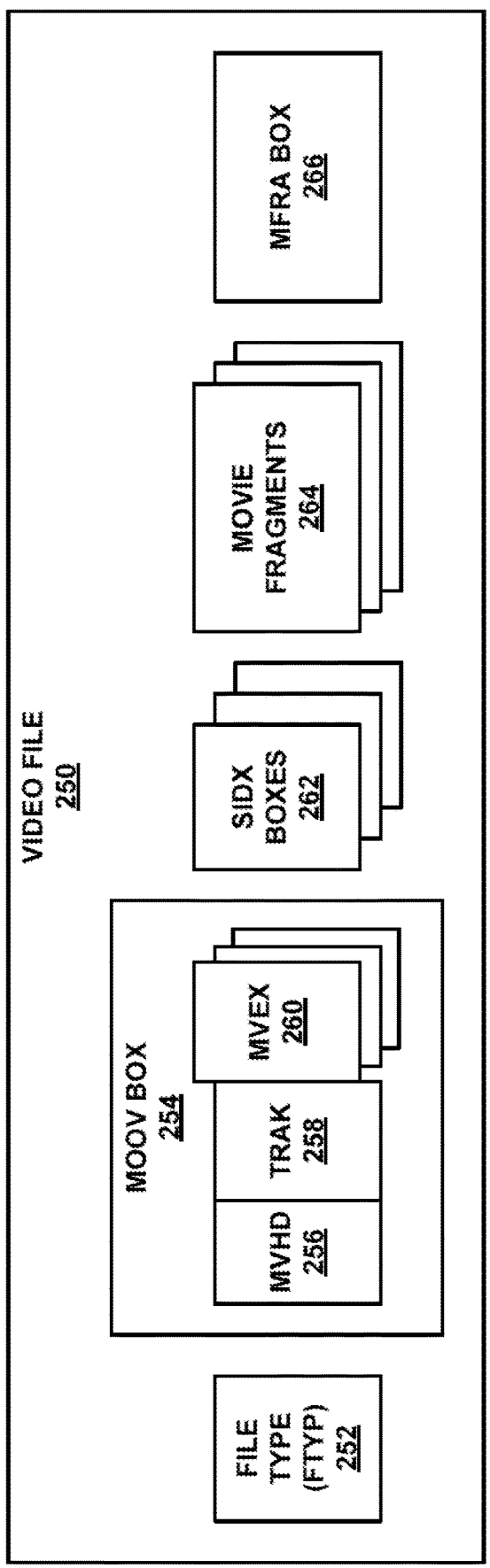
FIG. 7 is a block diagram illustrating elements of an example video file.

FIG. 7 is a block diagram illustrating elements of an example video file 250, which may correspond to a segment of a representation, such as one of segments 228, 232 of FIG. 6. Each of segments 228, 232 may include data that conforms substantially to the arrangement of data illustrated in the example of FIG. 7. Video file 250 may be said to encapsulate a segment. As described above, video files in accordance with the ISO base media file format and extensions thereof store data in a series of objects, referred to as "boxes." In the example of FIG. 7, video file 250 includes file type (FTYP) box 252, movie (MOOV) box 254, segment index (sidx) boxes 262, movie fragment (MOOF) boxes 164, and movie fragment random access (MFRA) box 266. Although FIG. 7 represents an example of a video file, it should be understood that other media files may include other types of media data (e.g., audio data, timed text data, or the like) that is structured similarly to the data of video file 250, in accordance with the ISO base media file format and its extensions.

File type (FTYP) box 252 generally describes a file type for video file 250. File type box 252 may include data that identifies a specification that describes a best use for video file 250. File type box 252 may alternatively be placed before MOOV box 254, movie fragment boxes 164, and/or MFRA box 266.

In some examples, a Segment, such as video file 250, may include an MPD update box (not shown) before FTYP box 252. The MPD update box may include information indicating that an MPD corresponding to a representation including video file 250 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 250, where the STYP box may define a segment type for video file 250.

FIG. 7, discussed in greater detail below, provides additional information with respect to the MPD update box.

MOOV box 254, in the example of FIG. 7, includes movie header (MVHD) box 256, track (TRAK) box 258, and one or more movie extends (MVEX) boxes 260. In general, MVHD box 256 may describe general characteristics of video file 250. For example, MVHD box 256 may include data that describes when video file 250 was originally created, when video file 250 was last modified, a timescale for video file 250, a duration of playback for video file 250, or other data that generally describes video file 250.

TRAK box 258 may include data for a track of video file 250. TRAK box 258 may include a track header (TKHD) box that describes characteristics of the track corresponding to TRAK box 258. In some examples, TRAK box 258 may include coded video pictures, while in other examples, the coded video pictures of the track may be included in movie fragments 264, which may be referenced by data of TRAK box 258 and/or sidx boxes 262.

In some examples, video file 250 may include more than one track. Accordingly, MOOV box 254 may include a number of TRAK boxes equal to the number of tracks in video file 250. TRAK box 258 may describe characteristics of a corresponding track of video file 250. For example, TRAK box 258 may describe temporal and/or spatial information for the corresponding track. A TRAK box similar to TRAK box 258 of MOOV box 254 may describe characteristics of a parameter set track, when encapsulation unit 150 (FIG. 6) includes a parameter set track in a video file, such as video file 250. Encapsulation unit 150 may signal the presence of sequence level SEI messages in the parameter set track within the TRAK box describing the parameter set track.

MVEX boxes 260 may describe characteristics of corresponding movie fragments 264, e.g., to signal that video file 250 includes movie fragments 264, in addition to video data included within MOOV box 254, if any. In the context of streaming video data, coded video pictures may be included in movie fragments 264 rather than in MOOV box 254. Accordingly, all coded video samples may be included in movie fragments 264, rather than in MOOV box 254.

MOOV box 254 may include a number of MVEX boxes 260 equal to the number of movie fragments 264 in video file 250. Each of MVEX boxes 260 may describe characteristics of a corresponding one of movie fragments 264. For example, each MVEX box may include a movie extends header box (MEHD) box that describes a temporal duration for the corresponding one of movie fragments 264.

As noted above, encapsulation unit 150 of FIG. 4 may store a sequence data set in a video sample that does not include actual coded video data. A video sample may generally correspond to an access unit, which is a representation of a coded picture at a specific time instance. In the context of AVC, the coded picture include one or more VCL NAL units which contains the information to construct all the pixels of the access unit and other associated non-VCL NAL units, such as SEI messages. Accordingly, encapsulation unit 150 may include a sequence data set, which may include sequence level SEI messages, in one of movie fragments 264. Encapsulation unit 150 may further signal the presence of a sequence data set and/or sequence level SEI messages as being present in one of movie fragments 264 within the one of MVEX boxes 260 corresponding to the one of movie fragments 264.

SIDX boxes 262 are optional elements of video file 250. That is, video files conforming to the 3GPP file format, or other such file formats, do not necessarily include SIDX boxes 262. In accordance with the example of the 3GPP file format, a SIDX box may be used to identify a sub-segment of a segment (e.g., a segment contained within video file 250). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 262 generally provide information representative of one or more sub-segments of a segment included in video file 250. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 264 may include one or more coded video pictures. In some examples, movie fragments 264 may include one or more groups of pictures (GOPs), each of which may include a number of coded video pictures, e.g., frames or pictures. In addition, as described above, movie fragments 264 may include sequence data sets in some examples. Each of movie fragments 264 may include a movie fragment header box (MFHD, not shown in FIG. 7). The MFHD box may describe characteristics of the corresponding movie fragment, such as a sequence number for the movie fragment. Movie fragments 264 may be included in order of sequence number in video file 250.

MFRA box 266 may describe random access points within movie fragments 264 of video file 250. This may assist with performing trick modes, such as performing seeks to particular temporal locations (i.e., playback times) within a segment encapsulated by video file 250. MFRA box 266 is generally optional and need not be included in video files, in some examples. Likewise, a client device, such as client device 180 of FIG. 4, does not necessarily need to reference MFRA box 266 to correctly decode and display video data of video file 250. MFRA box 266 may include a number of track fragment random access (TFRA) boxes (not shown) equal to the number of tracks of video file 250, or in some examples, equal to the number of media tracks (e.g., non-hint tracks) of video file 250.

In some examples, movie fragments 264 may include one or more stream access points (SAPs), such as IDR pictures. Likewise, MFRA box 266 may provide indications of locations within video file 250 of the SAPs. Accordingly, a temporal sub-sequence of video file 250 may be formed from SAPs of video file 250. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal subsequence.

Figure 8:
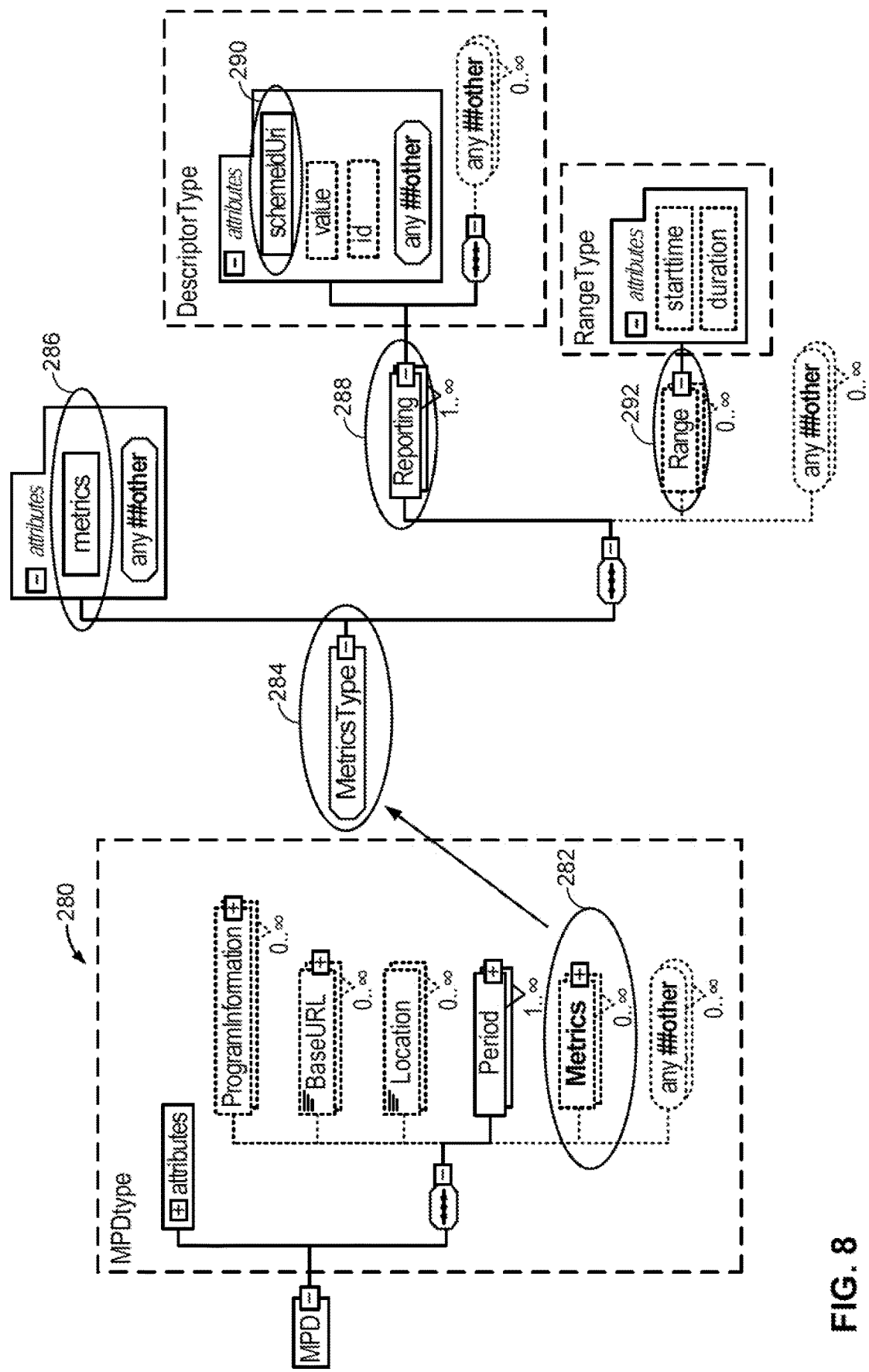
FIG. 8 is a conceptual diagram illustrating example data that may be included in a manifest file, such as a media presentation description (MPD) of DASH, in accordance with the techniques of this disclosure.

FIG. 8 is a conceptual diagram illustrating example data 280 that may be included in a manifest file, such as a media presentation description (MPD) of DASH, in accordance with the techniques of this disclosure. In this example, the MPD may include one or more metrics elements 282 in the MPDtype box. The existing 3GP-DASH limits support to one occurrence of the metrics element.

Furthermore, the MPD includes a MetricsType 284 attributes list, which specifies metrics 286 to collect (and may also include collections parameters, e.g., in parentheses). MetricsType attributes list 284 may also include one or more Reporting elements 288. Each Reporting element may include an attribute specifying a SchemIdURI 290, which may be a uniform resource name (URN) as defined in 3GP-DASH. This SchemeIdURI 290 element may include structured data added as extension elements or attributes in a separate namespace. The value of the SchemeIdURI 290 element may specify an identifier of a server to which to report Moreover, the MPD includes zero or more Range elements 292 for the MetricsType element. Each range element 292 generally includes data indicating when to collect QoE metrics. If range element 292 is omitted, a DASH client/middleware unit may determine that metrics are collected for the whole session. Range element 292 in this example includes starttime element 289 and duration element 291. When streaming live media content, starttime element 289 may specify a starting time relative to the availability start time for the media content. Duration element 291 may specify a duration in playback time for the range for which metrics are to be reported.

Thus, the metrics elements 282 may be defined at the MPD root level. The possible values of the reporting SchemeIdURI 290 are not defined in MPEG DASH. In general, SchemeIdURI 290 may be a uniform resource locator (URL), a uniform resource name (URN), or other identifier value. A value specific to 3GPP is defined in 3GP-DASH 26.247. Value element 285 of reporting element 288 in the attribute list is used for a list of parameters. ID element 287 of reporting element 288 identifies equivalent reporting schemes whereby only one of multiple reporting schemeIdURIs needs to be considered if multiple such elements have the same ID.

Section 10.5 of 3GP-DASH 26.247 version d00 specifies an XML (extensible markup language) syntax of the scheme information for the 3GP-DASH quality reporting scheme as follows:

```
<?xml version="1.0"?>
<xs:schema
targetNamespace="urn:3GPP:ns:PSS:AdaptiveHTTPStreaming:2009:qm"
    attributeFormDefault="unqualified"
    elementFormDefault="qualified"
    xmlns:xs="http://www.w3.org/2001/XMLSchema"
    xmlns:xlink="http://www.w3.org/1999/xlink"
    xmlns="urn:3GPP:ns:PSS:AdaptiveHTTPStreaming:2009:qm">
  <xs:annotation>
    <xs:appinfo>3GPP DASH Quality Reporting</xs:appinfo>
    <xs:documentation xml:lang="en">
      This Schema defines the quality reporting scheme information
for 3GPP DASH.
    </xs:documentation>
  </xs:annotation>
<xs:element name="ThreeGPQualityReporting"
type="SimpleQualityReportingType"/>
```

-continued

```
<xs:complexType name="SimpleQualityReportingType">
  <xs:attribute name="apn" type="xs:string" use="optional"/>
  <xs:attribute name="format" type="FormatType" use="optional"/>
  <xs:attribute name="samplePercentage" type="xs:double"
use="optional"/>
  <xs:attribute name="reportingServer" type="xs:anyURI"
use="required"/>
  <xs:attribute name="reportingInterval" type="xs:unsignedInt"
use="optional"/>
</xs:complexType>
<xs:simpleType name="FormatType">
  <xs:restriction base="xs:string">
    <xs:enumeration value="uncompressed" />
    <xs:enumeration value="gzip" />
  </xs:restriction>
</xs:simpleType>
</xs:schema>
```

The element "xmlns="urn:3GPP:ns:PSS:AdaptiveHTTP-Streaming:2009:qm">" specifies a separate namespace.

As noted above, the MPD according to this disclosure allows the definition of multiple metrics elements. If more than one metrics elements are defined, then the DASH client (e.g., DASH client 212 of FIG. 5) may create a distinct metrics report for each metric element of the MPD. This is contrary to the existing 3GP-DASH specification, which states, "At most one Metrics element shall be present in the MPD." Moreover, the 3GP-DASH specification may be modified according to this disclosure, such that the specification mandates that DASH clients generate one metrics report per metrics element of the MPD.

Figure 9:
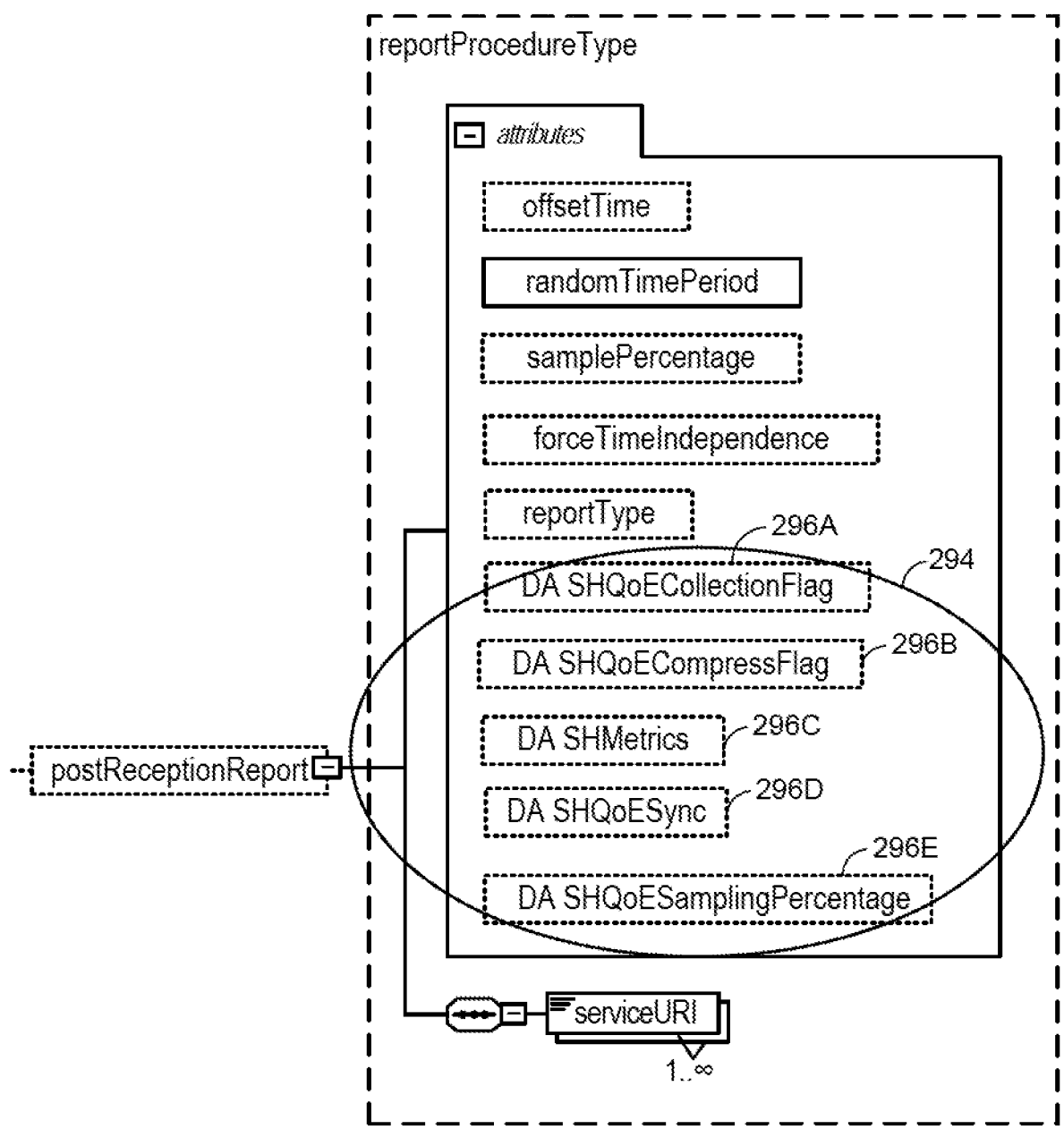
FIG. 9 is a conceptual diagram illustrating an example modification to an associated delivery procedure description (ADPD) in accordance with the techniques of this disclosure.

FIG. 9 is a conceptual diagram illustrating an example modification 294 to an associated delivery procedure description (ADPD) in accordance with the techniques of this disclosure. In accordance with the techniques of this disclosure, modification 294 to the ADPD may provide:

A flag 296A indicating whether DASH QoE reporting should be collected.
  a) Alternatively: DASH QoE attributes may be added within an element; if element is present, then DASH QoE collection is active. In this case, collection flag 296A is not needed.

If flag 296A above is set to true, then any or all of the following conditional attributes may be added as part of modification 294:
  a) A flag 296B indicating whether DASH QoE should be compressed.
  b) A list of metrics 296C to collect.
    Alternatively, these metrics could be specified in session description protocol (SDP) data.
  c) A flag 296D indicating whether DASH QoE collection should be synchronized to reception reporting.
  d) Optional DASH QoE sampling percentage data 296E.

In addition, modification 294 to the ADPD may include a flag (not shown) that indicates to the middleware whether existing metrics information in the MPD should be discarded/suppressed.

Figure 10:
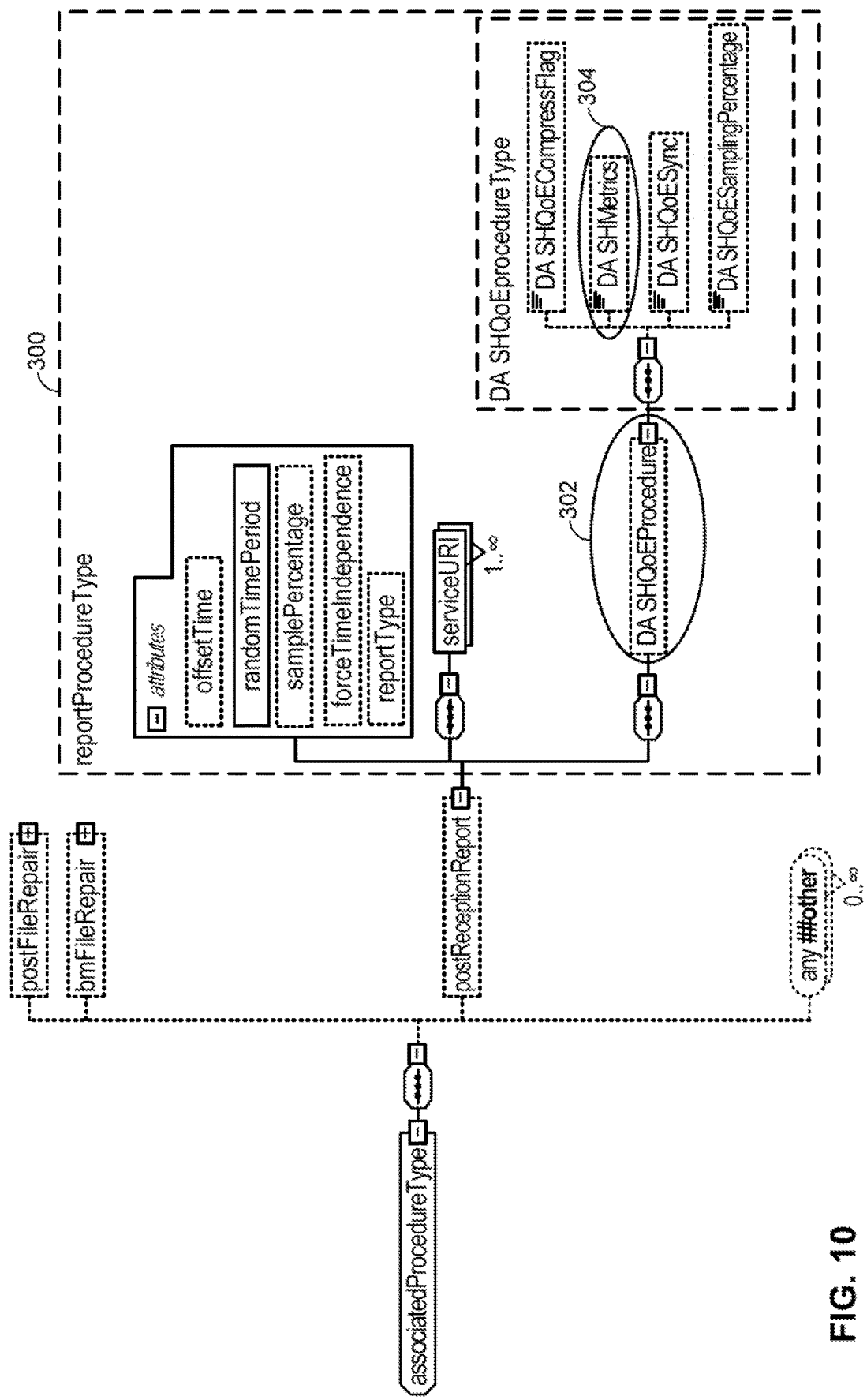
FIG. 10 is a conceptual diagram illustrating an alternative schema for an ADPD in accordance with the techniques of this disclosure.

FIG. 10 is a conceptual diagram illustrating an alternative schema for an ADPD in accordance with the techniques of this disclosure. In this example, the report procedure type element 300 of the ADPD includes an additional DASHQoEProcedure element 302. The presence of this additional DASHQoEProcedure element 302 triggers the collection of DASH QoE measurements, specified in DASH metrics element 304, as part of reception reports. DASH metrics element 304, circled in FIG. 10, could be made mandatory to ensure some metrics are defined.

As noted above, there may be a flag, such as DASH QoE Sync flag 306, indicating whether DASH QoE collection should be synchronized to reception reporting. Synchronization behaviors may be defined as follows, according to the value of the DASH QoE sync flag 306:

Scenario 1: DASH QoE Sync flag 306 is set to true, no other sampling percentage is included for DASH QoE=>if RR is active, collect DASH QoE measurement.

Scenario 2: the DASH QoE Sync flag 306 is set to true, a conditional sampling percentage 308 is included for DASH QoE. This implies that if RR is active, the middleware should collect DASH QoE measurements according to indicated conditional probability.

a) Example: Reception reporting sampling percentage is 50%; DASH QoE sampling percentage is 50%, then 50% of the time reception reports are collected; when reception reports are collected, DASH QoE reports are collected 50% of the time (resulting probability of collection will be 25% for DASH QoE measurement reports).

Scenario 3: the sync flag is set to false, a sampling percentage is included for DASH QoE (or default is 100%). This implies that independently of RR activity, the middleware should collect DASH QoE measurements at indicated probability. In this alternative, reception reports delivered to the reception reporting server may include only DASH QoE metrics.

Examples of aggregation of reception reports and DASH QoE measurement reports are described below. In some examples, eMBMS reception reports and DASH QoE measurement reports are aggregated in a single log file using the existing procedure which makes use of the multipart/mixed file format.

In a first example, the content-type of reception reports may be used to differentiate the two types of reports e.g. text/xml for reception report log files and text/xml-DASH for DASH reports. In accordance with this first example, the report may be formatted as shown below:

POST/reporting/reception/directory
Content-Length: xxx
Content-Type: multipart/mixed; boundary=frontier
Host: w.x.y.z:port
Connection: Keep-Alive
--frontier
Content-Type: text/xml
LOG (eMBMS RR)
--frontier
Content-Type: text/xml-DASH
LOG (DASH QoE Measurement report)
--frontier
etc.

In a second example, the same text/xml content type may be used. The receiver can recognize report type through header part of xml file. In accordance with this second example, the report may be formatted as shown below:

POST/reporting/reception/directory
Content-Length: xxx
Content-Type: multipart/mixed; boundary=frontier
Host: w.x.y.z:port
Connection: Keep-Alive
--frontier
Content-Type: text/xml
LOG (eMBMS RR)
--frontier
Content-Type: text/xml
LOG (DASH QoE Measurement report)
--frontier
etc.

In yet another example, the DASH measurement reports may be embedded within the eMBMS reception reports as new elements of the MBMS reception reporting schema.

In one example, it is assumed that the Sync flag is on. It may be recommended that the Sync flag be always set to 1 (that is, on). In some implementations, the sync flag attribute/element may not be part of the schema with the assumption that DASH QoE measurements are always collected in Sync with eMBMS reception reports. DASH QoE measurement through reception report post may only be active if reception reporting is active. With the sync flag ON, an aggregated reception report may contain only eMBMS reception reports or a mix of eMBMS reception reports and DASH QoE measurement reports.

In one example, a metrics attribute list mimics a list of directives provided in the ADPD. The SchemeIDURI elements may be filled as follows:

Compression flag (follows ADPD compression directive).
Sampling percentage (e.g., 100%, to always receive the report at middleware; middleware can then decide whether to keep report or discard per ADPD sampling percentage and sync flag directives).
Post URL (which may point to the middleware HTTP server, e.g., proxy/local server 202 of FIG. 5).
Intervals may be optional (may be set to smaller intervals to ensure smaller more frequent reports are obtained by middleware; the more frequent reporting may provide robustness in case of crashes of the DASH client and/or middleware).

In one example, the Range element may be excluded, such that there is always a DASH QoE report for the full session. Alternatively, the Range element may be included to specify a time period for which QoE metrics are to be reported.

The middleware unit (e.g., middleware unit 200 of FIG. 5) may modify the MPD passed to the DASH Client such that the DASH client always generates DASH QoE measurement reports that it then posts to the middleware. However, the middleware unit may be configured to probabilistically determine whether to report the received DASH QoE metrics. That is, the DASH QoE metrics may be reported according to the same probability as specified in the ADPD. Thus, in some instances, the DASH QoE report received by the middleware unit from the DASH client may be discarded, without being reported to the server (i.e., in instances where it is determined not to report reception according to the ADPD probability).

Figure 11A:
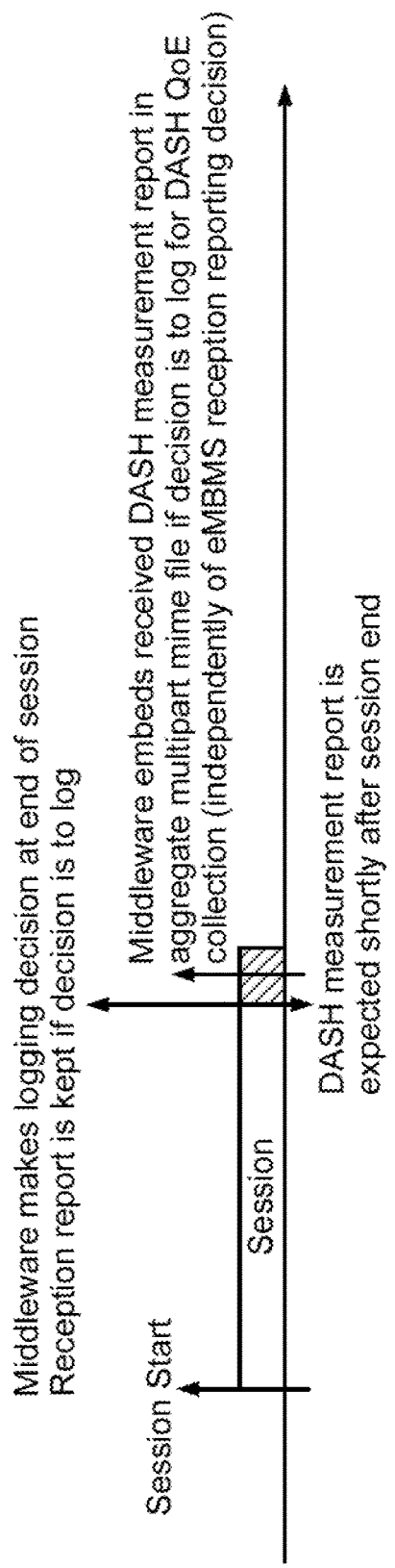
FIG. 11A is a conceptual diagram illustrating an example of the techniques of this disclosure.

FIG. 11A is a conceptual diagram illustrating an example performance of the techniques of this disclosure. In this example, it is assumed that the Sync flag discussed above is on (i.e. has a value of "true"). The example process may be as follows:

A DASH measurement report is generated at the end of every DASH viewing session.
Per the 3GPP eMBMS specification, the eMBMS middleware makes a logging decision at the end of a receiving/viewing session.
At the end of the eMBMS session, the middleware has collected reception reporting logs:
 a) Assume the middleware logging decision is to log. The middleware embeds any received DASH measurement reports in the eMBMS reception report using the multi-part mime file format. The eMBMS reception report, in the form of the mixed multi-part mime file, is upload using the randomization period specified in the ADPD.

b) Assume that the middleware logging decision is not to log. In this case, the collected reception report at the middleware is discarded. Any subsequently received reports from the DASH client for the session are also discarded.

As an alternative, DASH QoE Quality reports may be generated periodically. This may provide better reliability in case of DASH client crashes. Reports may still be embedded in multi-part mime reception report file. A potential problem is that the decision to log has not been made yet, so the middleware unit may have to discard reports at a later time based on reception reporting logging decision.

In an alternative example, it is assumed that the Sync flag is off. The DASH QoE measurement reporting through the reception report post may be active independently of whether the decision is to log for eMBMS reception reporting. The aggregated reception report may contain only eMBMS reception reports, a mix of eMBMS reception reports and DASH QoE measurement reports, or only DASH QoE measurement reports. This is in contrast to when the Sync flag is on where an uploaded reception report file always contains a 3GPP reception report.

Referring back to the example of FIG. 8, the MPD may be the same when the Sync flag is off as when the Sync flag is on as discussed above. However, the DASH QoE metrics report may always be collected by the DASH client, and the middleware unit may determine whether to include the DASH QoE metrics report in a log file for reception reporting.

Figure 11B:
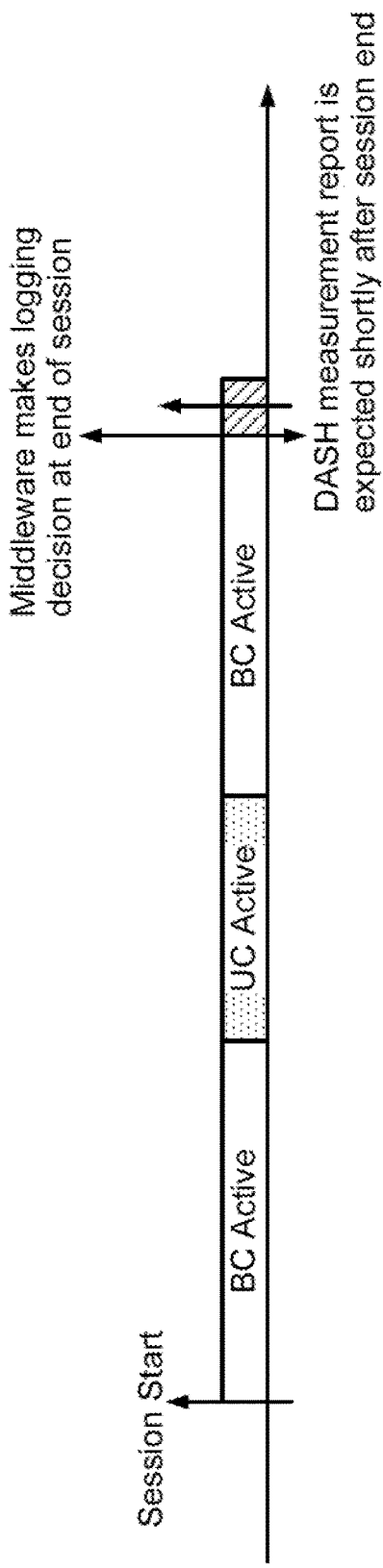
FIG. 11B is a conceptual diagram illustrating an example of behavior with parallel unicast/broadcast reception.

FIG. 11B is a conceptual diagram illustrating an example of behavior with parallel unicast/broadcast reception in accordance with the techniques of this disclosure. Middleware unit 200 may serve eMBMS registered clients segments received over eMBMS and switch to unicast (MooD design) if eMBMS service is no longer available. In this case, eMBMS may aggregate reception reports and DASH QoE measurement reports across the duration of the session where the service is active. It is expected that middleware unit 200 keeps the FLUTE session active even if the UE switches to Unicast. That is, middleware unit 200 may continue to collect the reception report throughout the period of loss of broadcast content.

Figure 12:
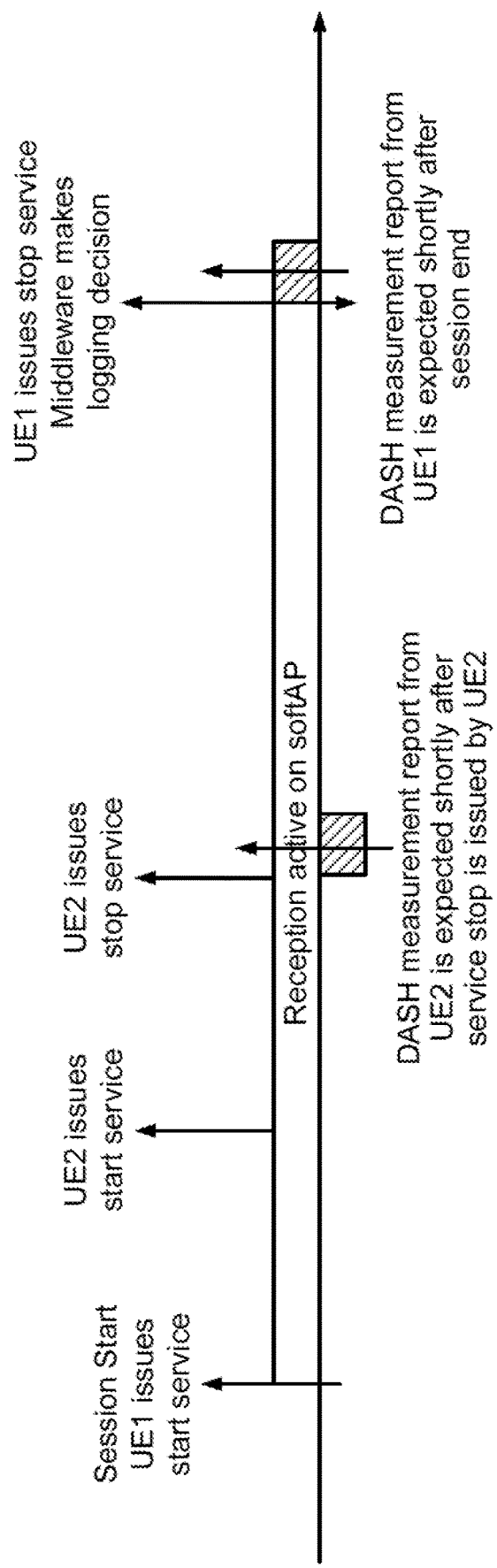
FIG. 12 is a conceptual diagram illustrating an example of behavior with multiple DASH clients.

FIG. 12 is a conceptual diagram illustrating an example of behavior with multiple DASH clients. For instance, in the case of softAP architectures, multiple DASH clients may consume eMBMS content from a common middleware. In such examples, the middleware may collect all DASH measurements reports during and until shortly after the session ends. The middleware may embed all DASH measurement reports in a common reception report, which may include specifying identifiers for respective DASH clients (e.g., in a clientID field in DASH measurement report).

Figure 13:
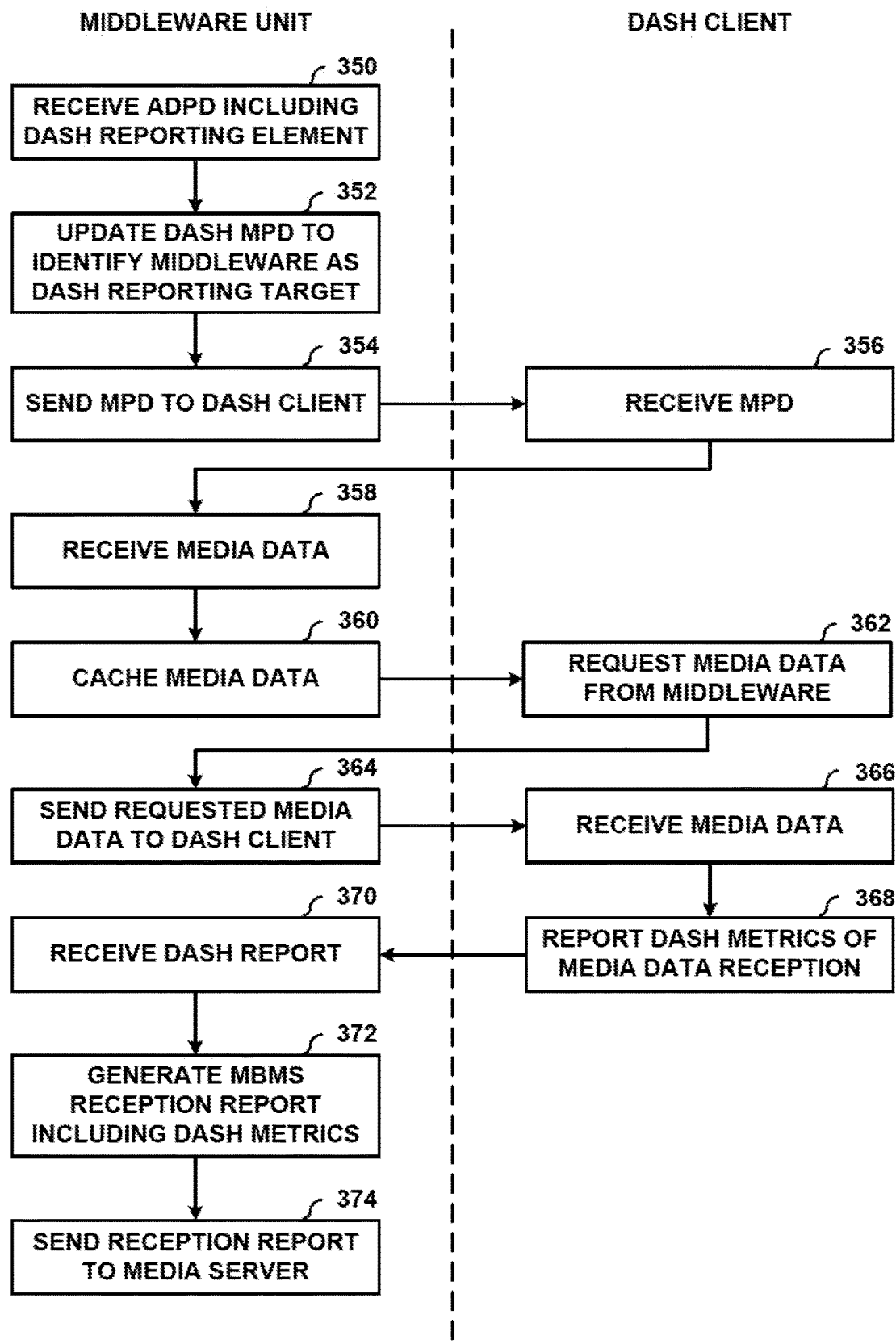
FIG. 13 is a flowchart illustrating an example method in accordance with the techniques of this disclosure.

FIG. 13 is a flowchart illustrating an example method in accordance with the techniques of this disclosure. The steps of the example method of FIG. 13 are described as being performed by middleware unit 200 and DASH client 212 of FIG. 5, respectively. It should be understood that this or a similar method could be performed by other sets of middleware and DASH clients, such as, for example, MSDC 112', 112" and DASH client 108', 108" of FIGS. 2 and 3.

Initially, middleware unit 200 receives an ADPD including a DASH reporting element (350). As discussed above, the DASH reporting element may include one or more of a flag indicating whether DASH metrics are to be reported, DASH metrics to be reported, whether DASH metric reporting is to be synchronized with MBMS reception reports, and/or a DASH QoE sampling percentage if DASH metric reporting is not synchronized with MBMS reception reports.

Assuming that the ADPD indicates that DASH metrics are to be included in MBMS reception reports, middleware unit 200 may update a manifest file, such as a DASH MPD, to identify middleware unit 200 as the target for DASH metrics reporting (352). For example, middleware unit 200 may specify a localhost address as the address of a DASH metrics reception reporting server in the manifest file. Middleware unit 200 may further send the manifest file, e.g., the DASH MPD, to DASH client 212 (354). DASH client 212 may also receive the MPD from middleware unit 200 (356).

Subsequently, middleware unit 200 may receive media data (358), e.g., in accordance with an MBMS or eMBMS broadcast or multicast. Middleware unit 200 may cache the received media data (360), e.g., in cache 204. DASH client 212 may then request all or a portion of the received media data from middleware unit 200 (362). In response to the request, middleware unit 200 may send the requested media data to DASH client 212 (364).

DASH client 212 may then receive the media data (366). DASH client 212 may also report the DASH metrics for media data reception to middleware unit 200 (368), e.g., in accordance with the manifest file received from middleware unit 200. Although not shown in FIG. 13, it should be understood that DASH client 212 may also process the received media data, e.g., by delivering the received media data to media application 214.

Middleware unit 200 may receive the DASH metrics report from DASH client 212 (370). For example, middleware unit 200 may receive an HTTP POST submission including the DASH metrics from DASH client 212. In the example of FIG. 13, middleware unit 200 generates an MBMS reception report including the DASH metrics (372). In this manner, middleware unit 200 may generate a reception report covering reception of media data according to reporting directives of an ADPD received from a server device, which also includes DASH QoE reports received from DASH client 212. However, in other examples, middleware unit 200 may deliver the MBMS reception reporting and DASH QoE reports separately, and in some cases to separate reporting servers. In the example of FIG. 13, however, middleware unit 200 sends the reception report, including the DASH metrics received from DASH client 212, to a media server from which the media data was received (374).

In one example, middleware unit 200 assigns different multipart MIME types to the MBMS reception report and the DASH metrics, to differentiate between these two reports. That is, middleware unit 200 may assign a first multipart MIME type value to the MBMS reception report and a second, different multipart MIME type value to the DASH metrics. In this manner, the reception reporting server to which middleware unit 200 delivers the reception reports can differentiate the MBMS reception report from the DASH metrics using the multipart MIME types.

In this manner, the method of FIG. 13 represents an example of a method, performed by a middleware unit of a client device, including receiving media data via broadcast or multicast from a server device, generating reception reports covering the reception of the media data according to received reporting directives, delivering at least part of the media data to a target application of the client device, receiving quality of experience (QoE) reports from the target application, and providing contents of the QoE reports to a reception reporting server. Again, in this example, the reception reports include the contents of the QoE reports, but in other examples, these reports may be delivered separately and/or to separate reporting servers.

Figure 14:
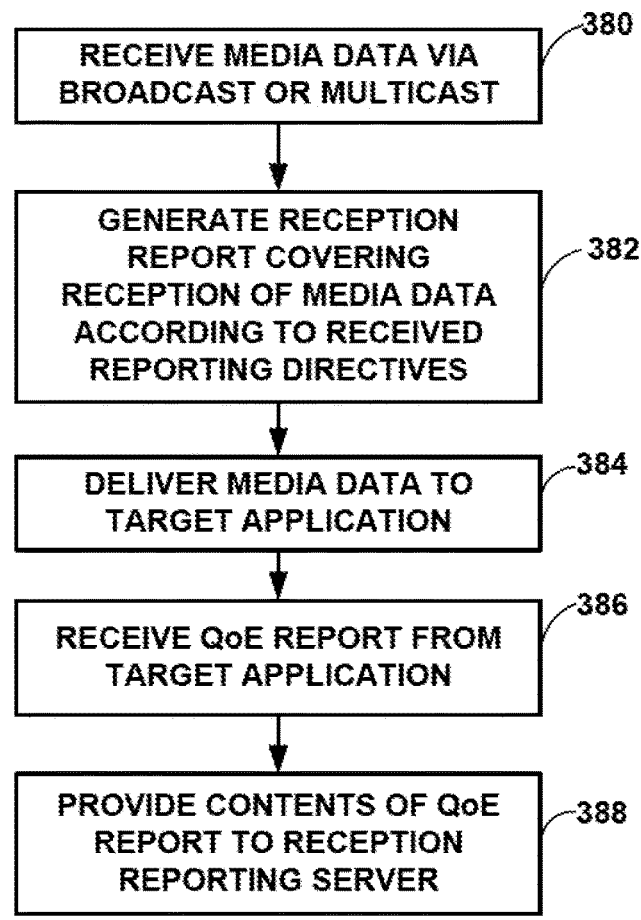
FIG. 14 is a flowchart illustrating another example method in accordance with the techniques of this disclosure.

FIG. 14 is a flowchart illustrating another example method in accordance with the techniques of this disclosure. The method of FIG. 14 is described with respect to middleware unit 200, although it should be understood that other devices, such as MSDC 112', 112" of FIGS. 2 and 3, may be configured to perform this or a similar method.

Initially in this example, middleware unit 200 receives media data via broadcast or multicast (380), e.g., in accordance with MBMS or eMBMS. Although not shown in FIG. 14, it should be understood that prior to receiving the media data, middleware unit 200 may subscribe to a particular MBMS or eMBMS service. Additionally, middleware unit 200 may receive an ADPD including reporting directives, such as when to generate reception reports, what information to include in the reception reports, and the like. Moreover, the ADPD may, in accordance with the techniques of this disclosure, include data indicating whether DASH QoE reports are to be included in the reception reports or submitted separately, and if the DASH QoE reports are to be submitted separately, a network address of a DASH QoE metrics reporting server.

Middleware unit 200 then, in this example, generates a reception report covering reception of the media data in accordance with the received reporting directives (382) of the ADPD. In general, reception reports are sent after a backoff time and a randomization period. This delay will ensure that the middleware can receive the DASH Qoe measurements reports generated by the DASH client. In any case, it should be understood that the posting of the reception report need not be performed immediately after receiving the media data, but could instead be delayed, if needed, until after receiving a DASH QoE metrics report, as discussed below.

Middleware unit 200 also delivers the media data to a target application (384), e.g., a DASH client, such as DASH client 212 of FIG. 5. In particular, middleware unit 200 may cache the received media data, e.g., in cache 204, and await a request for the media data, or portions thereof, from DASH client 212. Middleware unit 200 may send the requested media data to DASH client 212 in response to such requests. The requests may comprise HTTP GET or partial GET requests (that is, GET requests that specify byte ranges of a target URL). Furthermore, prior to delivering the media data to DASH client 212, middleware unit 200 may send a manifest file, such as an MPD, to DASH client 212. The manifest file may indicate that DASH QoE metric reports are to be delivered to middleware unit 200, as well as other manifest file information, such as URLs for media files, wall clock times indicating when the media files will be available, and the like. Moreover, middleware unit 200 may modify the manifest file to identify middleware unit 200 as the server to which DASH client 212 is to send DASH QoE metrics reports.

In this example, after delivering the media data to the target application, middleware unit 200 receives a QoE report from the target application (386). For example, middleware unit 200 may receive DASH QoE report from DASH client 212. The DASH QoE report may include data representing values for various requested DASH metrics, such as average throughput, initial playout delay, and MPD information, in addition to a list of HTTP Request/Response transactions, a list of representation switch events, a buffer level, a list of TCP connections, a list of representation switch events, a buffer level, and/or a play list.

Middleware unit 200 may then provide the contents of the DASH QoE report to the reception reporting server (388), e.g., as indicated by the ADPD. In one example, middleware unit 200 may deliver the MBMS or eMBMS reception report and the contents of the DASH QoE report separately. In other examples, middleware unit 200 may deliver the MBMS/eMBMS reception report and the contents of the DASH QoE report together, e.g., in a single document (e.g., a single file or other data set). In some examples, when these reports are delivered together, middleware unit 200 may identify the reports using distinct multipart MIME types, e.g., a first multipart MIME type for the MBMS reception report and a second, different multipart MIME type for the DASH QoE report.

In this manner, the method of FIG. 14 represents an example of a method, performed by a middleware unit of a client device, including receiving media data via broadcast or multicast from a server device, generating reception reports covering the reception of the media data according to received reporting directives, delivering at least part of the media data to a target application of the client device, receiving quality of experience (QoE) reports from the target application, and providing contents of the QoE reports to a reception reporting server. Again, in this example, the reception reports include the contents of the QoE reports, but in other examples, these reports may be delivered separately and/or to separate reporting servers. Alternatively, middleware unit 200 may use distinct XML headers to distinguish the MBMS reception report from the DASH QoE report.

Figure 15:
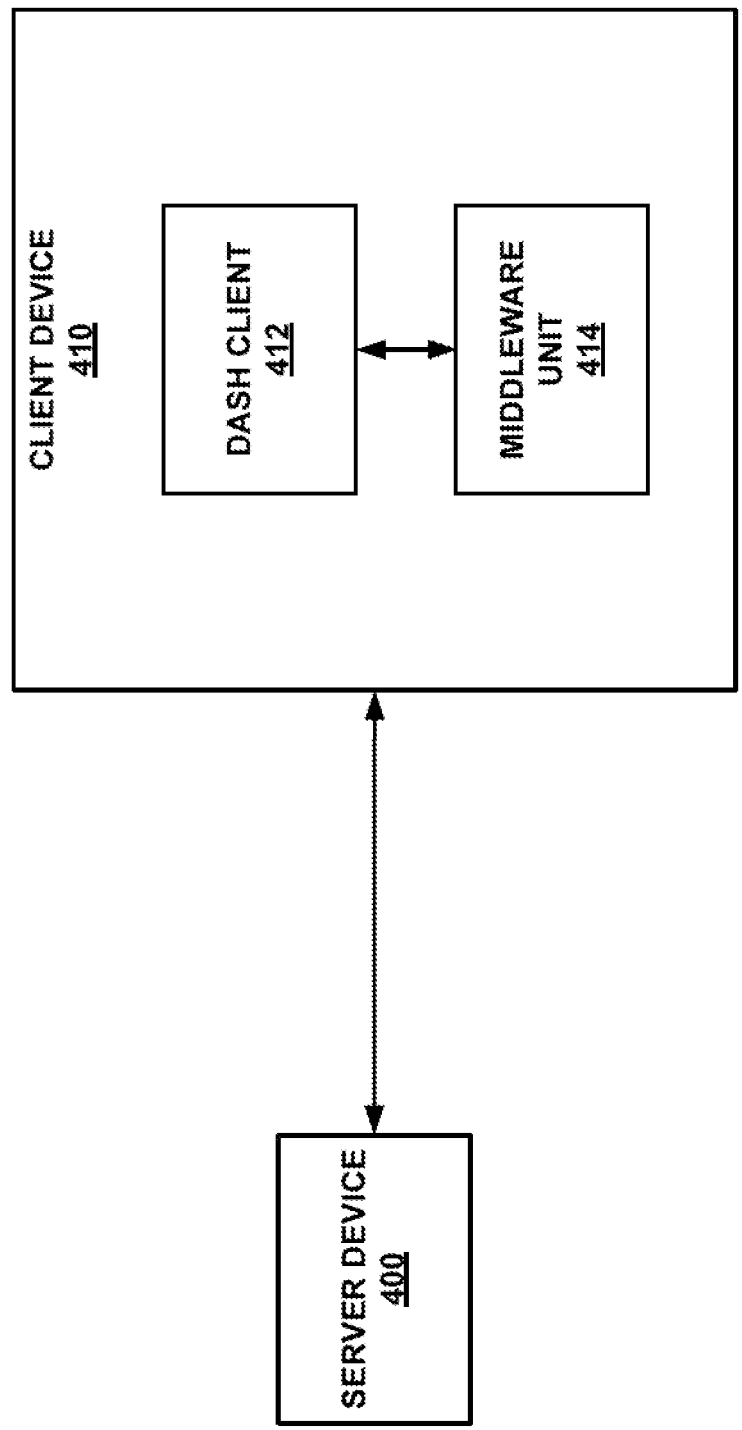
FIG. 15 is a block diagram illustrating examples of a server device and a client device configured according to techniques of this disclosure.

FIG. 15 is a block diagram illustrating examples of a server device 400 and a client device 410 configured according to techniques of this disclosure. Server device 400 may correspond to provisioning server and BMSC 104 of FIG. 2 or 3, server device 160, and/or content preparation device 140 of FIG. 4. Client device 410 may correspond to UE 106 of FIG. 2 or 3 and/or client device 180 of FIG. 4. Thus, client device 410 represents an example of user equipment (UE), such as a personal computer, mobile device such as a cellphone, tablet, or laptop, set top box, or the like.

In this example, client device 410 includes DASH client 412 and middleware unit 414. DASH client 412 may correspond to DASH client 108' of FIG. 2, DASH client 108" of FIG. 3, or DASH client 212 of retrieval unit 192 in FIG. 5. Middleware unit 414 may correspond to MSDC 112' of FIG. 2, MSDC 112" of FIG. 3, or eMBMS middleware 200 of retrieval unit 192 in FIG. 5. DASH client 412 may represent, for example, a software-based plug-in to a web browser executed by client device 410.

Middleware unit 414 and DASH client 412 may be implemented in hardware, software, firmware, or a combination thereof. When implemented in software or firmware, it is expected that requisite hardware, such as computer-readable media and one or more processing units, are also provided. In general, the processing units are implemented using fixed or programmable digital logic circuitry, such as one or more ASICs, DSPs, FPGAs, microprocessors, or the like.

In accordance with the techniques of this disclosure, middleware unit 414 may be configured to receive media data via broadcast or multicast from server device 400, generate reception reports covering the reception of the media data according to received reporting directives, deliver at least part of the media data to DASH client 412 (representing an example of a target application in this example) of client device 410, receive quality of experience (QoE) reports from DASH client 412, and provide contents of the QoE reports to a reception reporting server. The reception reporting server may correspond to server device 400, or a separate server device (not shown).

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of generating quality measurement reports, the method comprising:
   receiving, by a middleware unit of a client device, media data via broadcast or multicast from a server device;
   generating, by the middleware unit, broadcast or multicast reception reports covering the reception of the media data via the broadcast or the multicast according to received reporting directives;
   sending, by the middleware unit according to a broadcast or multicast protocol, the broadcast or multicast reception reports to a broadcast or multicast reception reporting server;
   delivering, by the middleware unit, at least part of the media data to a target application of the client device via a hypertext transfer protocol (HTTP)-based streaming service in response to HTTP requests from the target application, the target application comprising a streaming application;
   receiving, by the middleware unit via the HTTP-based streaming service, HTTP streaming quality of experience (QoE) reports from the target application, the HTTP streaming QoE reports including data representing HTTP streaming metrics; and
   providing, by the middleware unit on behalf of the target application, contents of the HTTP streaming QoE reports to an HTTP streaming metric collection server.

2. The method of claim 1, where the HTTP streaming metric collection server is the same as the server device.

3. The method of claim 1, further comprising signaling, to the target application, a localhost address of the client device as a destination address to which the target application is to send the QoE reports.

4. The method of claim 3, wherein receiving the QoE reports comprises receiving, by the middleware unit, an HTTP POST of the QoE reports to the specified localhost address from the target application.

5. The method of claim 1, further comprising sending, to the target application, a manifest file for the media data that includes data indicating the QoE reports to be reported.

6. The method of claim 5, further comprising modifying an original version of the manifest file for the media data to include the data indicating the QoE reports to be provided to the server device.

7. The method of claim 6, further comprising receiving the data indicating the QoE reports to be provided to the server device from the server device.

8. The method of claim 5, wherein the manifest file includes a plurality of metrics elements, each of the plurality of metrics elements including respective attribute metrics to be provided to the server device.

9. The method of claim 1, further comprising receiving data indicating that the QoE reports are to be reported to the HTTP streaming metric collection server.

10. The method of claim 9, wherein receiving the data further comprises receiving data indicating at least one of whether the QoE reports are to be compressed, the list of QoE reports to be reported, whether reporting of QoE reports is to be synchronized with reception reporting for the broadcast or multicast, or a DASH QoE sampling percentage representative of a conditional probability for which QoE reports should be reported.

11. The method of claim 9, wherein receiving the data comprises receiving the data in an associated delivery procedure description (ADPD).

12. The method of claim 1, wherein providing the QoE reports comprises sending a single document to the server device, the single document including the QoE reports and the reception reporting data, and wherein sending the single document comprises:
    setting a first value for a multipart MIME type of the QoE reports in the single document; and
    setting a second, different value for the multipart MIME type of the reception reporting data in the single document.

13. The method of claim 1, wherein providing the QoE reports comprises sending a single document to the server device, the single document including the QoE reports and the reception reporting data, and wherein sending the single document comprises:
    setting a first extensible markup language (XML) header of the QoE reports in the single document; and
    setting a second, different XML header of the reception reporting data in the single document.

14. The method of claim 1, further comprising:
    sending instructions to the target application to report the QoE reports for all received data; and
    discarding at least some of the reports based on a collection probability.

15. The method of claim 1, wherein the target application comprises a first target application, wherein receiving the QoE reports comprises receiving a first set of QoE reports from the first target application, the method further comprising:
    receiving a plurality of QoE reports, including the first set of QoE reports, from a plurality of target applications, including the first target application,
    wherein providing the QoE reports comprises sending a report including the plurality of QoE reports to the HTTP streaming metric collection server.

16. The method of claim 1, wherein the broadcast or multicast reception reporting server is the same as the HTTP streaming metric collection server.

17. The method of claim 1, wherein the broadcast or multicast reception reporting server is different than the HTTP streaming metric collection server.

18. A device for generating quality measurement reports, the device comprising:
    one or more hardware-based processors implemented using digital circuitry, the processors being configured to execute a middleware unit and a target application for media data, wherein the middleware unit is configured to:
        receive media data via broadcast or multicast from a server device;
        generate broadcast or multicast reception reports covering the reception of the media data via broadcast or multicast according to received reporting directives;
        send, according to a broadcast or multicast protocol, the broadcast or multicast reception reports to a broadcast or multicast reception reporting server;
        deliver at least part of the media data to a target application of the client device via a hypertext transfer protocol (HTTP)-based streaming service in response to HTTP requests from the target application, the target application comprising a streaming application;
        receive, via the HTTP-based streaming service, HTTP streaming quality of experience (QoE) reports from the target application, the HTTP streaming QoE reports including data representing HTTP streaming metrics; and
        provide, on behalf of the target application, contents of the HTTP streaming QoE reports to an HTTP streaming metric collection server.

19. The device of claim 18, wherein the middleware unit is further configured to send, to the target application, a manifest file specifying a localhost address of the client device as a destination address to which the target application is to send the QoE reports, and to receive an HTTP POST of the QoE reports to the specified localhost address from the target application.

20. The device of claim 18, wherein the middleware unit is further configured to send, to the target application, a manifest file for the media data that includes data indicating the QoE reports to be reported.

21. The device of claim 18, wherein the middleware unit is further configured to receive an associated delivery procedure description (ADPD) indicating that the QoE reports are to be reported to the HTTP streaming metric collection server and indicating at least one of whether the QoE reports are to be compressed, the list of QoE reports to be reported, whether reporting of QoE reports is to be synchronized with reception reporting for the broadcast or multicast, or a DASH QoE sampling percentage representative of a conditional probability for which QoE reports should be reported.

22. The device of claim 18, wherein the middleware unit is configured to send a single document to the server device, the single document including the QoE reports and the reception reporting data, and whereon to send the single document, the middleware unit is configured to:
    set a first value for a multipart MIME type of the QoE reports in the single document; and
    set a second, different value for the multipart MIME type of the reception reporting data in the single document.

23. The device of claim 18, wherein the middleware unit is configured to send a single document to the server device, the single document including the QoE reports and the reception reporting data, and whereon to send the single document, the middleware unit is configured to:
    set a first extensible markup language (XML) header of the QoE reports in the single document; and
    set a second, different XML header of the reception reporting data in the single document.

24. A computer-readable storage medium having stored thereon instructions that, when executed, cause a processor of a middleware unit of a client device to:
    receive media data via broadcast or multicast from a server device;
    generate broadcast or multicast reception reports covering the reception of the media data via broadcast or multicast according to received reporting directives;
    send, according to a broadcast or multicast protocol, the broadcast or multicast reception reports to a broadcast or multicast reception reporting server;
    deliver at least part of the media data to a target application of the client device via a hypertext transfer protocol (HTTP)-based streaming service in response to HTTP requests from the target application, the target application comprising a streaming application;

receive, via the HTTP-based streaming service, HTTP streaming quality of experience (QoE) reports from the target application, the HTTP streaming QoE reports including data representing HTTP streaming metrics; and provide, on behalf of the target application, contents of the HTTP streaming QoE reports to an HTTP streaming metric collection server.

25. The computer-readable storage medium of claim 24, further comprising instructions that cause the processor to send, to the target application, a manifest file specifying a localhost address of the device as a destination address to which the target application is to send the QoE reports, wherein the means for receiving the QoE reports comprises means for receiving an HTTP POST of the QoE reports to the specified localhost address from the target application.

26. The computer-readable storage medium of claim 24, further comprising instructions that cause the processor to send, to the target application, a manifest file for the media data that includes data indicating the QoE reports to be reported.

27. The computer-readable storage medium of claim 24, further comprising instructions that cause the processor to receive an associated delivery procedure description (ADPD) indicating that the QoE reports are to be reported to the broadcast or multicast reception reporting server and indicating at least one of whether the QoE reports are to be compressed, the list of QoE reports to be reported, whether reporting of QoE reports is to be synchronized with reception reporting for the broadcast or multicast, or a DASH QoE sampling percentage representative of a conditional probability for which QoE reports should be reported.

28. The computer-readable storage medium of claim 24, wherein the instructions that cause the processor to provide the QoE reports comprise instructions that cause the processor to send a single document to the server device, the single document including the QoE reports and the reception reporting data, and wherein instructions that cause the processor to send the single document comprise instructions that cause the processor to:

set a first value for a multipart MIME type of the QoE reports in the single document; and set a second, different value for the multipart MIME type of the reception reporting data in the single document.

29. The computer-readable storage medium of claim 24, wherein the instructions that cause the processor to provide the QoE reports comprise instructions that cause the processor to send a single document to the server device, the single document including the QoE reports and the reception reporting data, and wherein the instructions that cause the processor to send the single document comprise instructions that cause the processor to:

set a first extensible markup language (XML) header of the QoE reports in the single document; and set a second, different XML header of the reception reporting data in the single document.

\* \* \* \* \*